(12) United States Patent
Gunn et al.

(10) Patent No.: US 11,638,984 B2
(45) Date of Patent: May 2, 2023

(54) SEISMIC SWAY BRACE FITTING

(71) Applicant: Eaton Intelligent Power Limited, Dublin (IE)

(72) Inventors: Josh Gunn, New Baden, IL (US); David Henry Petry, Jr., O'Fallon, IL (US); Phillip Pruitt, Carlyle, IL (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 296 days.

(21) Appl. No.: 16/866,181

(22) Filed: May 4, 2020

(65) Prior Publication Data

US 2020/0346323 A1 Nov. 5, 2020

Related U.S. Application Data

(60) Provisional application No. 62/843,001, filed on May 3, 2019.

(51) Int. Cl.
*B25B 5/00* (2006.01)
*B25B 5/10* (2006.01)
*F16B 2/06* (2006.01)

(52) U.S. Cl.
CPC .............. *B25B 5/006* (2013.01); *B25B 5/101* (2013.01); *F16B 2/065* (2013.01)

(58) Field of Classification Search
CPC ......... B25B 5/006; B25B 5/101; B25B 5/082; B25B 5/056; B25B 5/103; F16B 2/065;
(Continued)

(56) References Cited

U.S. PATENT DOCUMENTS 2,699,601 A 1/1955 Darnell
3,733,655 A 5/1973 Kolibar
(Continued)

FOREIGN PATENT DOCUMENTS

CN 102132079 A 7/2011
CN 104736859 A 6/2015
(Continued)

OTHER PUBLICATIONS

International Search Report and Written Opinion for Application No. PCT/EP2020/025202, dated Aug. 3, 2020, 12 pages, Rijswijk, The Netherlands.
(Continued)

*Primary Examiner* — Lee D Wilson
*Assistant Examiner* — Jacob Adam Montgomery
(74) *Attorney, Agent, or Firm* — Stinson LLP

(57) ABSTRACT

A seismic sway brace fitting for a seismic brace includes a first jaw defining a threaded opening configured to receive a fastener to secure the seismic sway brace fitting to the seismic brace, and a second jaw. A pin connects the first and second jaws to one another. The first and second jaws define a space configured to receive an end portion of the seismic brace. The threaded opening is aligned with the space such that the fastener extends into the space to engage the end portion of the seismic brace when the fastener is received in the threaded opening to secure the seismic brace to the sway brace fitting. The first jaw includes at least one brace bearing surface configured to engage an end of the seismic brace to inhibit the rotation of the first jaw relative to the second jaw.

20 Claims, 19 Drawing Sheets

(58) Field of Classification Search
CPC ...... F16B 2/18; F16B 2/00; F16B 7/18; F16L 3/11
USPC ............ 269/246, 228, 264, 43, 45, 156, 95; 138/106; 248/226.11, 228.1, 65; 29/525.11
See application file for complete search history.

(56) References Cited

U.S. PATENT DOCUMENTS

| | | | |
|---|---|---|---|
| 5,110,074 A | 5/1992 | Deguchi | |
| 6,273,372 B1* | 8/2001 | Heath | F16L 3/243 248/62 |
| 6,415,560 B1 | 7/2002 | Rinderer | |
| 6,629,678 B1 | 10/2003 | Kirschner | |
| 6,708,966 B1 | 3/2004 | Traudt | |
| 6,837,010 B2 | 1/2005 | Powell et al. | |
| 6,896,226 B2 | 5/2005 | Heath | |
| 7,097,141 B2 | 8/2006 | Heath | |
| 7,140,579 B2 | 11/2006 | Kirschner | |
| 7,441,730 B2 | 10/2008 | Heath | |
| 7,654,043 B2 | 2/2010 | Heath | |
| 7,971,838 B2 | 7/2011 | Osborn et al. | |
| 8,038,106 B2* | 10/2011 | Magno, Jr. | H02G 3/32 248/65 |
| 8,070,113 B1 | 12/2011 | Kirschner | |
| 8,534,625 B2 | 9/2013 | Heath et al. | |
| 8,726,607 B1 | 5/2014 | Kirschner | |
| 9,052,038 B2 | 6/2015 | Radzik | |
| 9,163,422 B2 | 10/2015 | Heath | |
| 9,239,067 B2 | 1/2016 | Heath | |
| 9,611,874 B2 | 4/2017 | Heath | |
| 9,683,681 B2 | 6/2017 | Heath et al. | |
| 9,746,011 B2 | 8/2017 | Jiang | |
| 9,777,870 B2 | 10/2017 | Roth | |
| 9,834,921 B2 | 12/2017 | Nehls | |
| 10,036,487 B2 | 7/2018 | Duggan | |
| 10,054,143 B2 | 8/2018 | Allmon | |
| D858,262 S | 9/2019 | Wilson et al. | |
| 10,605,382 B2 | 3/2020 | Ohnemus | |
| D899,227 S | 10/2020 | Tang | |
| D899,229 S | 10/2020 | Tang | |
| 10,816,108 B2 | 10/2020 | Ohnemus | |
| D905,537 S | 12/2020 | Marsden | |
| D911,151 S | 2/2021 | Smith | |
| 2004/0031896 A1* | 2/2004 | Heath | F16B 2/06 248/351 |
| 2005/0189452 A1 | 9/2005 | Heath | |
| 2006/0024127 A1 | 2/2006 | Heath | |
| 2009/0183462 A1 | 6/2009 | Osborn | |
| 2009/0183443 A1 | 7/2009 | Osborn et al. | |
| 2012/0305723 A1* | 12/2012 | Heath | F16B 35/005 248/228.1 |
| 2012/0305726 A1 | 12/2012 | Hashimoto et al. | |
| 2013/0214098 A1 | 8/2013 | Greenfield | |
| 2015/0252916 A1 | 9/2015 | Heath et al. | |
| 2017/0122491 A1 | 5/2017 | Mancuso | |
| 2018/0045230 A1 | 2/2018 | Tourville et al. | |
| 2018/0073530 A1 | 3/2018 | Fletcher et al. | |
| 2020/0346323 A1 | 11/2020 | Gunn | |
| 2022/0049518 A1 | 2/2022 | Pruitt | |

FOREIGN PATENT DOCUMENTS

| | | |
|---|---|---|
| CN | 205712554 U | 11/2016 |
| CN | 106760021 A | 5/2017 |
| CN | 206145269 U | 5/2017 |
| CN | 206570940 U | 10/2017 |
| CN | 108825873 A | 11/2018 |
| GB | 1075795 | 7/1967 |
| GB | 1332711 A | 10/1973 |
| GB | 2247273 A | 2/1992 |
| GB | 2475840 A | 6/2011 |
| JP | 2004116658 A | 4/2004 |
| JP | 2009161938 A | 7/2009 |
| JP | 6329381 B2 | 5/2018 |
| KR | 20190009587 A | 1/2019 |
| KR | 20190015856 A | 2/2019 |

OTHER PUBLICATIONS

First Office Action and Search Report from CN202080038517.3, dated Oct. 31, 2022, 28 pages.

* cited by examiner

SEISMIC SWAY BRACE FITTING

CROSS-REFERENCE TO RELATED APPLICATION

This application claims priority to U.S. Provisional Patent Application Ser. No. 62/843,001, filed May 3, 2019, which is hereby incorporated by reference in its entirety.

FIELD OF THE DISCLOSURE

The present disclosure generally relates to a fitting for a seismic sway brace. The fitting can be used, for example, to connect to a brace of the seismic sway brace and attach the brace to a structural component of a building.

BACKGROUND OF THE DISCLOSURE

Seismic supporting systems may be used to support non-structural components (e.g., pipes, cable trays, HVAC components, conduits, etc.) in a building. Such seismic supporting systems include seismic sway braces and restraints (e.g., branch line restraints). Seismic sway braces are used to minimize the differential movement between the non-structural components in a building and the building itself. Examples of non-structural components in a building are utility pipes, which may include, but are not limited to, plastic pipes, conduits, round ducts, other types of pipes; cable trays; HVAC components, etc. A properly installed sway brace makes it possible for the building and the non-structural pipe to move as a single unit during an earthquake, thereby limiting damage to the non-structural pipe. Restraints hold the non-structural components in place to a lesser degree than seismic sway braces. For example, restraints inhibit the movement of fire sprinkler branch lines which could cause damage to themselves, the structure or other nearby non-structural systems, such as air handling ducts, plumbing or electrical systems. Building code NFPA describes requirements for both seismic sway braces and restraints. There are other types of seismic supporting systems other than seismic sway braces and restraints.

Typically, one end of the seismic sway brace is attached to the non-structural component and the other end of the seismic sway brace is attached to a structural component of the building such as a beam or a ceiling. One example of a typical seismic sway brace includes a fitting, a brace and a clamp. There are various types of braces, for example, such as pipes, channels and angle irons, with pipes being the most common. The fitting is secured to one end of the brace (e.g., pipe) and secures the brace to the structural component of the building. The clamp is secured to the other end of the seismic brace and secures the brace to the non-structural component. FIG. 1 illustrates a conventional fitting 1 for a seismic sway brace, which is further described in U.S. Pat. No. 6,273,372.

SUMMARY

In one aspect, a seismic sway brace fitting for a seismic brace generally comprises a first jaw defining a threaded opening configured to receive a fastener to secure the seismic sway brace fitting to the seismic brace, and a second jaw. A pin connects the first and second jaws to one another. The first and second jaws define a space configured to receive an end portion of the seismic brace. The threaded opening is aligned with the space such that the fastener extends into the space to engage the end portion of the seismic brace when the fastener is received in the threaded opening to secure the seismic brace to the sway brace fitting. The first jaw includes at least one brace bearing surface configured to engage an end of the seismic brace to inhibit the rotation of the first jaw relative to the second jaw.

In another aspect, a seismic sway brace fitting for a seismic brace generally comprises a first jaw defining a threaded opening configured to receive a fastener to secure the seismic brace to the sway brace fitting. The first jaw has proximal and distal ends. A second jaw is connected to the first jaw. A pin connects the first and second jaws. The pin is disposed between the proximal and distal ends of the first jaw. The first and second jaws define a space adjacent to the distal end of the first jaw. The space is configured to receive an end portion of the seismic brace. The threaded opening is aligned with the space such that the fastener extends into the space to engage the end portion of the seismic brace when the fastener is received in the threaded opening to secure the seismic brace to the sway brace fitting. The second jaw includes a bearing surface disposed proximally of the pin and configured to engage a portion of the first jaw to form a contact point between the first and second jaws.

DETAILED DESCRIPTION OF THE DISCLOSURE

Figure 1:
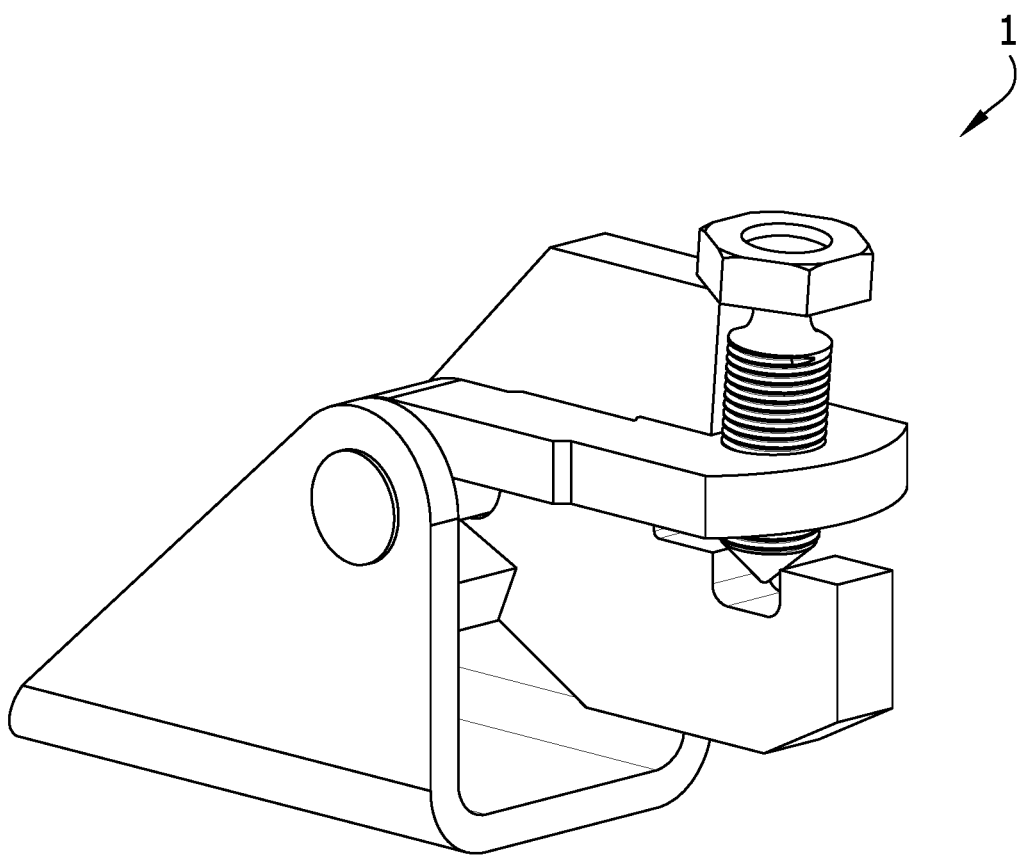
FIG. 1 is a perspective of a conventional seismic sway brace fitting of the prior art.

Referring to FIGS. 2-9, one embodiment of a seismic sway brace fitting (e.g., sway brace fitting or fitting) is generally indicated at reference numeral 10. The fitting 10 secures the seismic brace, such as a pipe P (FIG. 8), to a structural component (e.g., beam, column, ceiling, etc.) of a building, thereby securing the seismic sway brace to the building to brace a non-structural component (e.g., pipes, cable trays, HVAC components, conduits, etc.) within the building. Broadly, the fitting 10 is configured for use with a seismic brace P having a cylindrical cross-sectional shape, although in other embodiments the fitting may be configured to attach to seismic braces having other shapes. The fitting 10 is attached to the seismic brace P and the structural component to mount the seismic sway brace to the building. The fitting 10 is suitably configured for use in a seismic sway brace that braces a non-structural pipe, such as a utility pipe, which may include, but is not limited to, a pipe, conduit, a round duct, etc. As explained in more detail below, the fitting 10 includes multiple elements to prevent the fitting from disconnecting from the seismic brace P.

The fitting 10 includes a first jaw or collar 12 and a second jaw or center plate 14 connected to the first jaw. The first and second jaws 12, 14 define a space 16 configured to receive an end portion of a seismic brace P (e.g., an open end of a pipe). As explained in more detail below, the first and second jaws 12, 14 are configured to be positioned on opposite sides of a circumferential wall of the pipe P to grip the wall therebetween and secure the pipe P (e.g., seismic brace) to the fitting 10. The fitting 10 includes a pin 18 connecting the first and second jaws to one another and to a mounting bracket or yoke 20. In the illustrated embodiment, pivotable movement between the first and second jaws 12, 14 about the pin 18 is constrained, as described herein. The yoke 20 has a base 22 and opposite side walls 24 extending from the base. Each side wall 24 defines a pin opening 26 through which the pin 18 is received when the pin connects the first and second jaws 12, 14 to the mounting bracket 20. When the first and second jaws 12, 14 are connected to the mounting bracket 20, the first and second jaws are disposed between the side walls 24. The pin 18 pivotably connects the first and second jaws 12, 14 to the mounting bracket 20 such that the first and second jaws are free to rotate relative to the mounting bracket. The base 22 of the mounting bracket 20 defines an opening 28 configured to receive a fastener (not shown) to attach the mounting bracket, and therefore the fitting 10, to a structural component of a building.

Referring to FIGS. 2-11, the first jaw 12 has a proximal end 30 and a distal end 32. The first jaw 12 defines (e.g., has) a longitudinal axis LA1 extending between the proximal and distal ends 30, 32. The first jaw 12 includes a center portion 34 extending between the proximal and distal ends 30, 32. The center portion 34 of the first jaw 12 defines a threaded opening 36 (FIGS. 9 and 10) configured to receive a fastener 38 (e.g., bolt) to secure the seismic brace P to the fitting, as shown in FIGS. 2-6 and described in more detail below. The threaded opening 36 is disposed on the first jaw 12 (specifically, the center portion 34) such that the threaded opening is aligned with the space 16. In other words, the threaded opening 36 is in communication with the space 16. In this way, the fastener 38 extends into the space 16 (FIG. 5) to engage the end portion of the seismic brace P when the fastener is received (e.g., threaded) in the threaded opening 36 to secure the seismic brace to the fitting 10. The threaded opening 36 is adjacent the distal end 32 of the first jaw 12. The center portion 34 of the first jaw 24 also defines a second jaw opening 40 configured to enable a portion of the second jaw 14 to extend therethrough, as described in more detail below. The second jaw opening 40 is proximal to the threaded opening 36 and is longitudinally aligned with the threaded opening.

Figure 2:
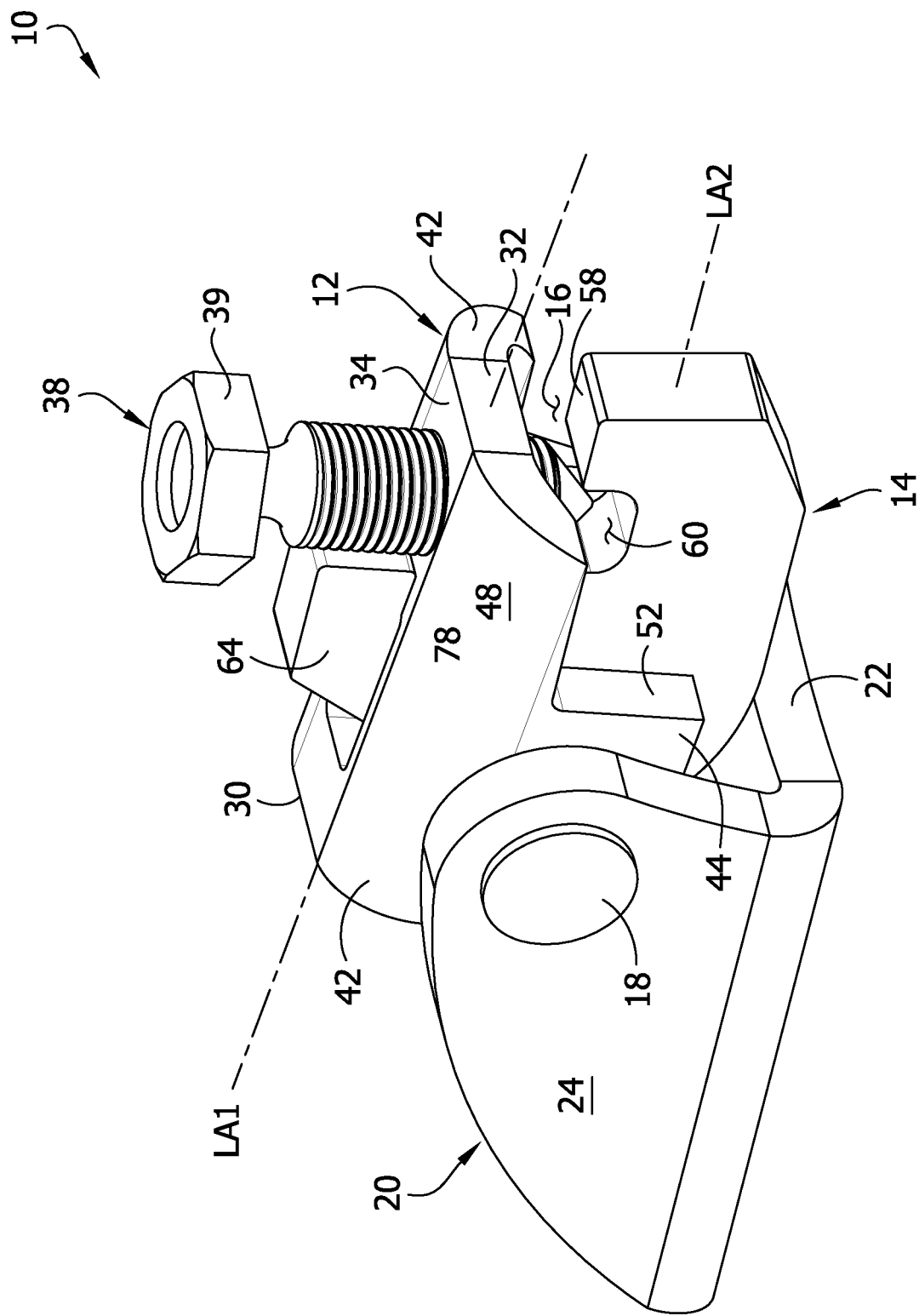
FIG. 2 is a front perspective of one embodiment of a seismic sway brace fitting according to the teachings of the present disclosure.
Figure 3:
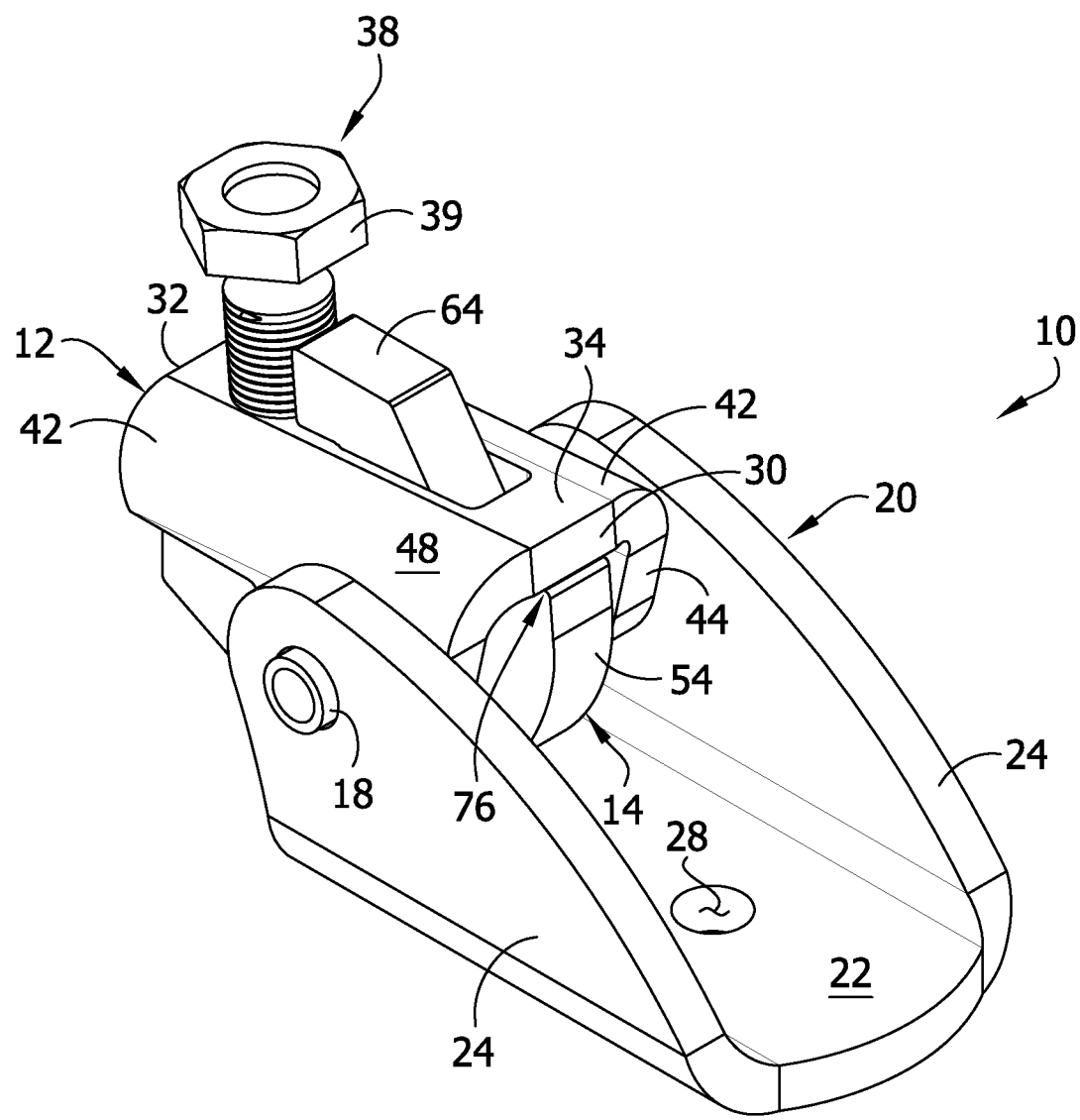
FIG. 3 is a rear perspective of the seismic sway brace fitting of FIG. 1.
Figure 4:
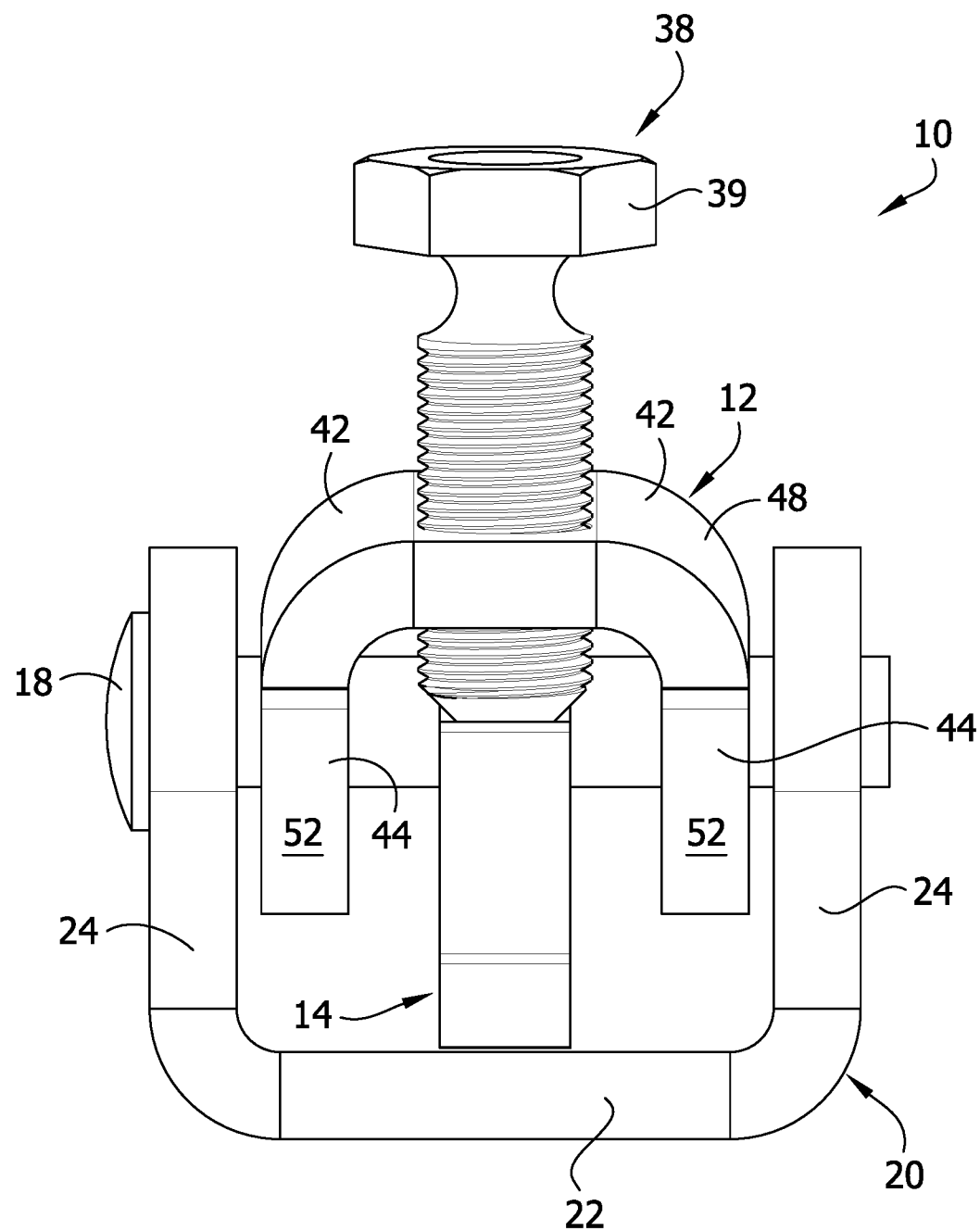
FIG. 4 is a front view of the seismic sway brace fitting of FIG. 1.

The first jaw 12 also includes opposite side portions 42 extending from the center portion 34. Each side portion 42 extends from a side (e.g., side edge margin) of the center portion 34. In illustrated embodiment, each side portion 42 is generally arcuate and extends generally downward. For reasons that will become apparent, preferably the curve of each side portion 42 corresponds to or is similar to the curve of the circumferential wall of the seismic brace P. Each side portion 42 extends between the proximal and distal ends 30, 32 of the first jaw 12. Generally, the side portions 42 define opposite sides of the space 16. The first jaw 12 includes a flange portion 44 extending from each side portion 42 (e.g., the first jaw includes two flange portions). Each flange portion 44 extends from a side (e.g., side edge margin) of one of the side portions 42. In the illustrated embodiment, each flange portion 44 is generally planar and extends generally downward. Each flange portion 44 extends from the proximal end 30 of the first jaw 12 toward the distal end 32. Each flange portion 44 defines a pin opening 46 (FIG. 9) aligned with one another and configured to align with the pin openings 26 in the mounting bracket 20 so that the pin 18 can extend therethough and connect the first jaw 12 to the mounting bracket. Broadly, the location the pin 18 extends through the first jaw 12 defines a pin location (e.g., pin openings 26), the pin location being between the proximal and distal ends 30, 32 of the first jaw. Together, the center portion 34, side portions 42 and flange portions 44 define an exterior (e.g., upper) surface 48 of the first jaw 12 and an interior (e.g., lower) surface 50 of the first jaw. As used throughout the present disclosure, the terms defining relative locations and positions of structures and components of the fitting 10, including but not limited to "top," "upper," "bottom," and "lower," are meant to provide a point of reference for such components and structures as shown in FIG. 2, with the understanding that the respective locations of such components and structures will depend on the orientation of the fitting.

The first jaw 12 is generally symmetrical about the longitudinal axis LA1. The first jaw 12 has a generally U-shape cross sectional shape (when taken normal to the longitudinal axis LA1). Specifically, the portion of the first jaw 12 (e.g., center portion 34, side portions 42) that defines the space 16 configured to receive the end portion of the seismic brace P has a generally U-shaped cross section.

Figure 8:
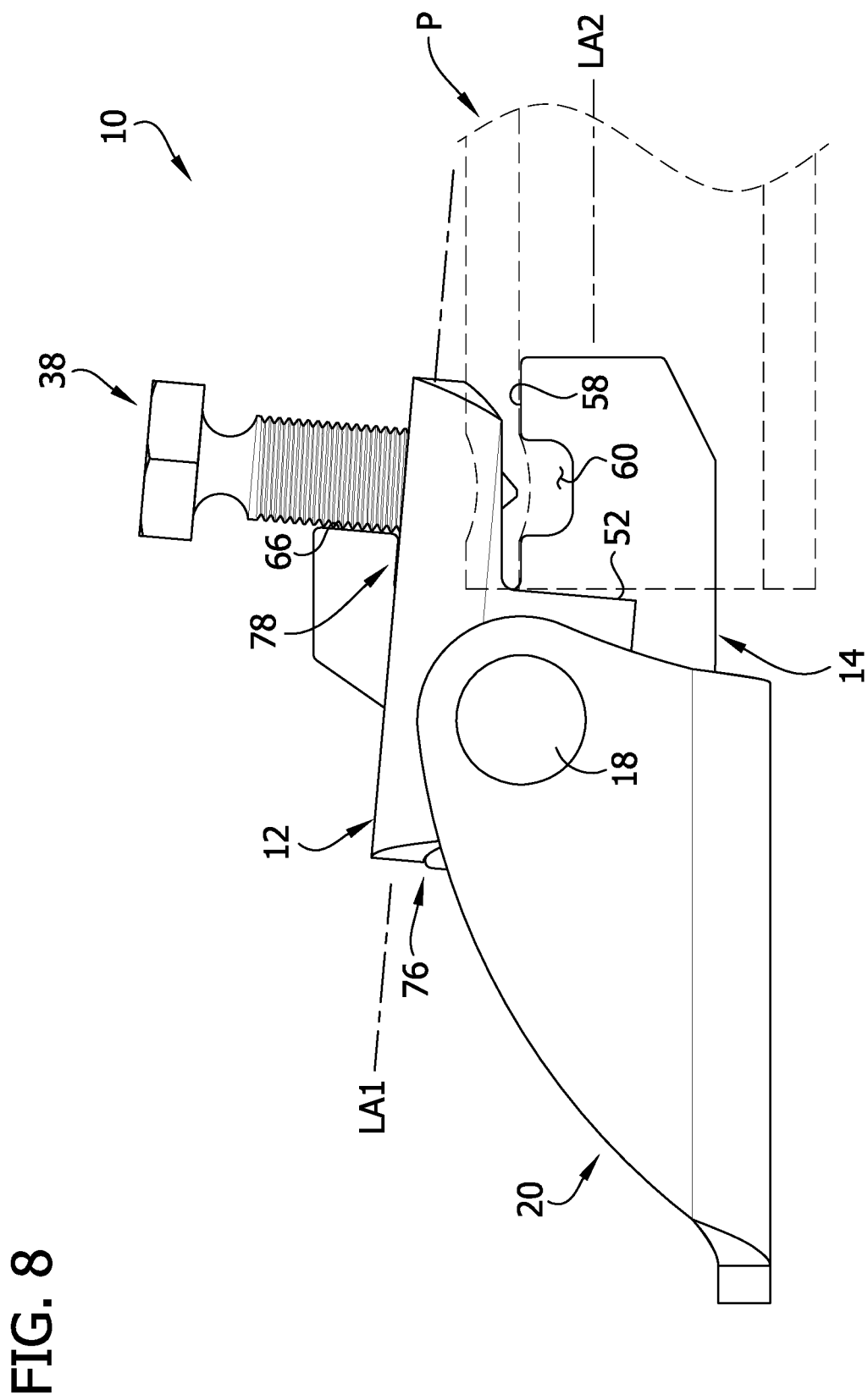
FIG. 8 is a left side view of the seismic sway brace fitting of FIG. 1 attached to a seismic brace.
Figure 9:
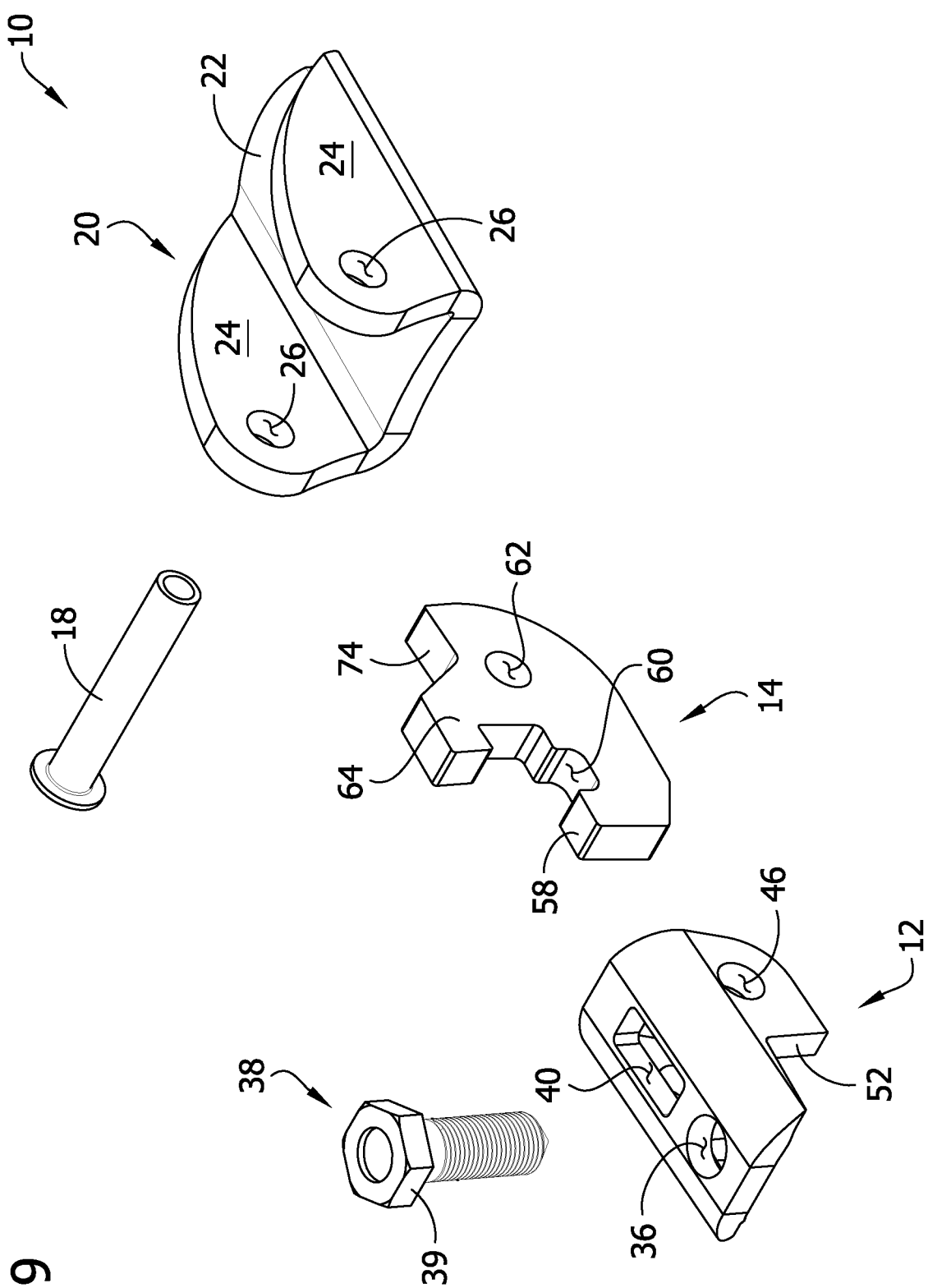
FIG. 9 is an exploded view of the seismic sway brace fitting of FIG. 1.
Figure 10:
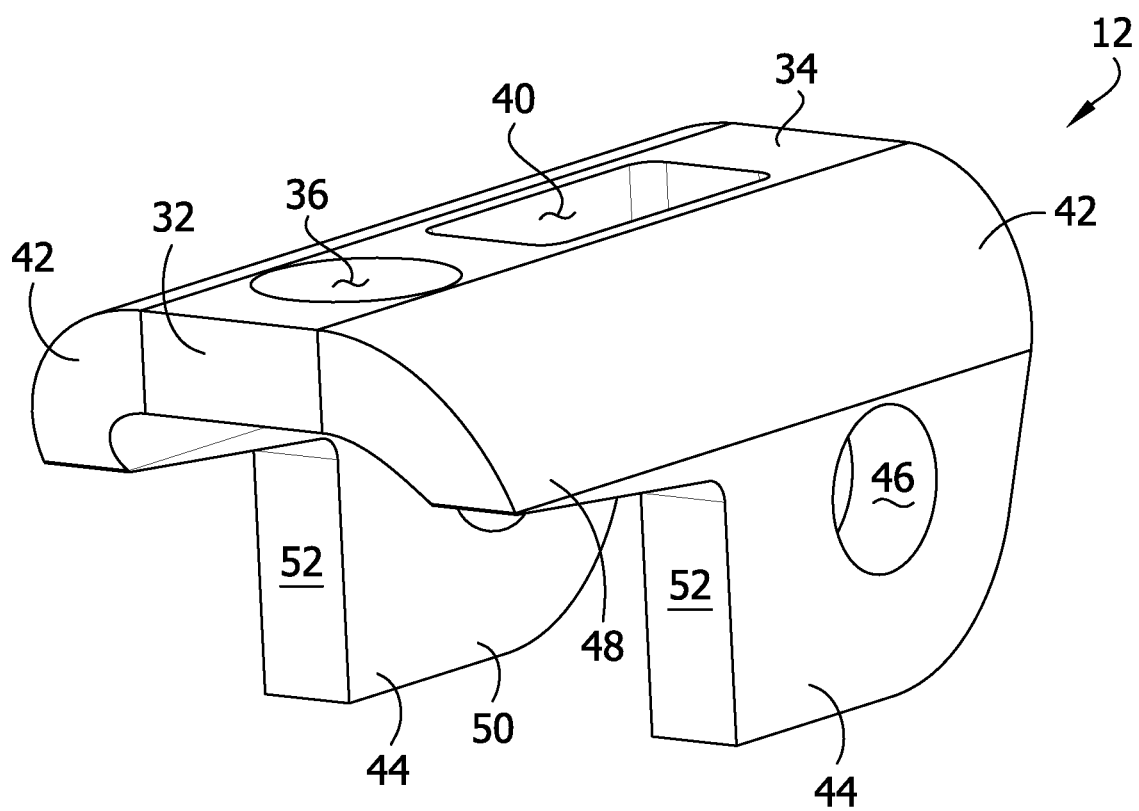
FIG. 10 is a front perspective of a first jaw of the seismic sway brace fitting of FIG. 1.
Figure 11:
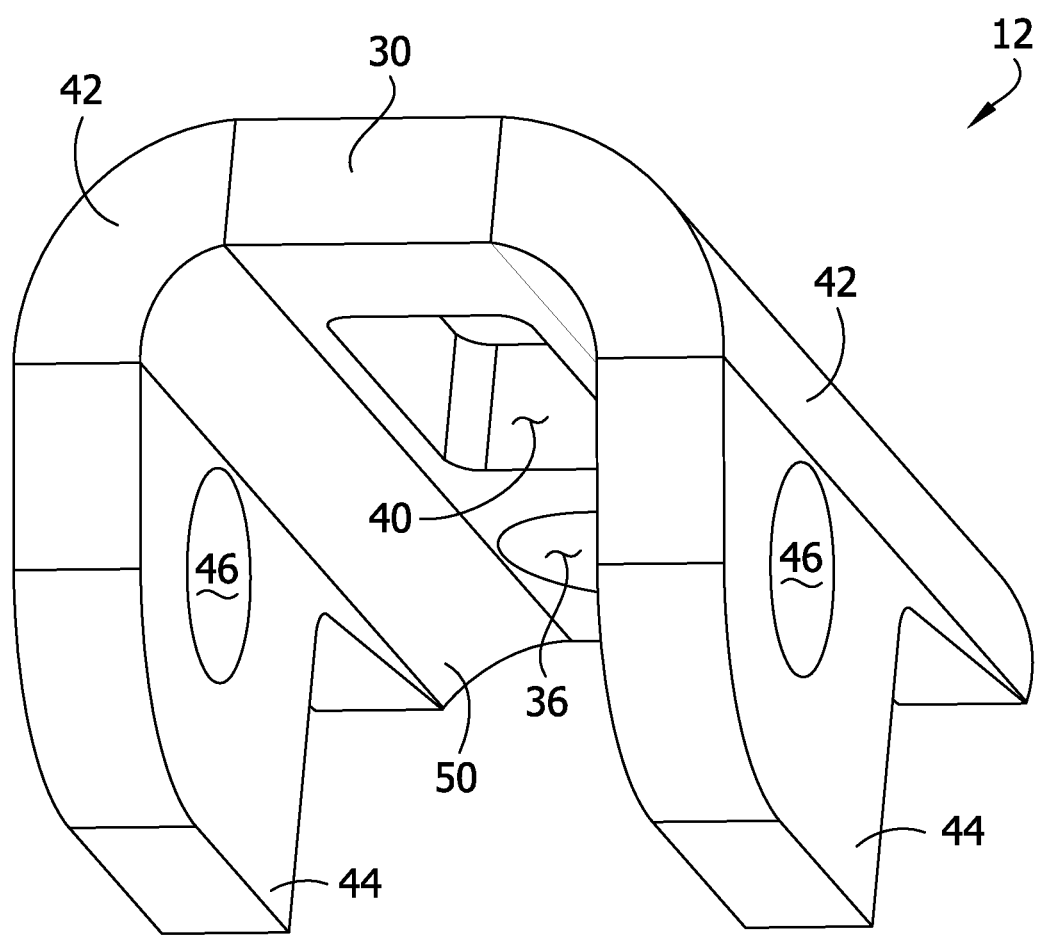
FIG. 11 is a rear perspective of the first jaw.

As shown in FIG. 8, for example, the first jaw 12 includes at least one brace bearing surface 52 configured to engage an end of the seismic brace P to inhibit the rotation of the first jaw relative to the second jaw 14, as explained in more detail below. In the illustrated embodiment, the first jaw 12 includes two brace bearing surfaces 52 (e.g., first and second brace bearing surfaces), with both brace bearing surfaces 52 configured to engage the end of the seismic brace P (FIG. 8) to inhibit the rotation of the first and second jaws 12, 14 relative to one another. In the illustrated embodiment, each of the brace bearing surfaces 52 are defined by one of the flange portions 44 (specifically, a distal edge margin thereof). Each brace bearing surface 52 is generally planar and is generally perpendicular to the longitudinal axis LA1.

Each brace bearing surface 52 is disposed between the distal end 32 of the first jaw 12 and the pin location. The brace bearing surfaces 52 define a proximal end of the space 16.

Referring to FIGS. 2-9 and 12-13, the second jaw 14 has a proximal end 54 and a distal end 56. The second jaw 14 defines (e.g., has) a longitudinal axis LA2 extending between the proximal and distal ends 54, 56. The distal portion of the second jaw 14 is configured to engage the seismic brace P (FIG. 8.). Specifically, the second jaw 14 includes an upper or gripping surface 58 (specifically, an upper edge margin thereof) extending proximally from the distal end 56 of the second jaw. The upper surface 58 is generally parallel to the longitudinal axis LA2. The upper surface 58 is configured to engage the interior surface of the circumferential wall of the seismic brace P. The second jaw 14 defines (e.g., has) a recess 60 configured to receive a deformed portion of the seismic brace P (FIG. 8) when the fastener 38 secures the seismic brace to the fitting 10, as described in more detail below. The recess 60 extends downward from the upper surface 58. The second jaw 14 defines a pin opening 62 configured to align with the pin openings 26 in the mounting bracket 20 and the pin openings 48 in the first jaw 12 so that the pin 18 can extend therethough and connect the first jaw, the second jaw and the mounting bracket together. Broadly, the location the pin 18 extends through the second jaw 12 defines a pin location, the pin location being between the proximal and distal ends 54, 56 of the second jaw. Specifically, the pin location (e.g., pin opening 62) is disposed proximally of the upper surface 58 (e.g., between the upper surface and the distal end 54 of the second jaw 14). The pin locations of the first and second jaws 12, 14 are coextensive (e.g., are aligned at the same position relative to the longitudinal axes LA1, LA2) and, broadly, form a single pin location (e.g., pivot point).

Figure 5:
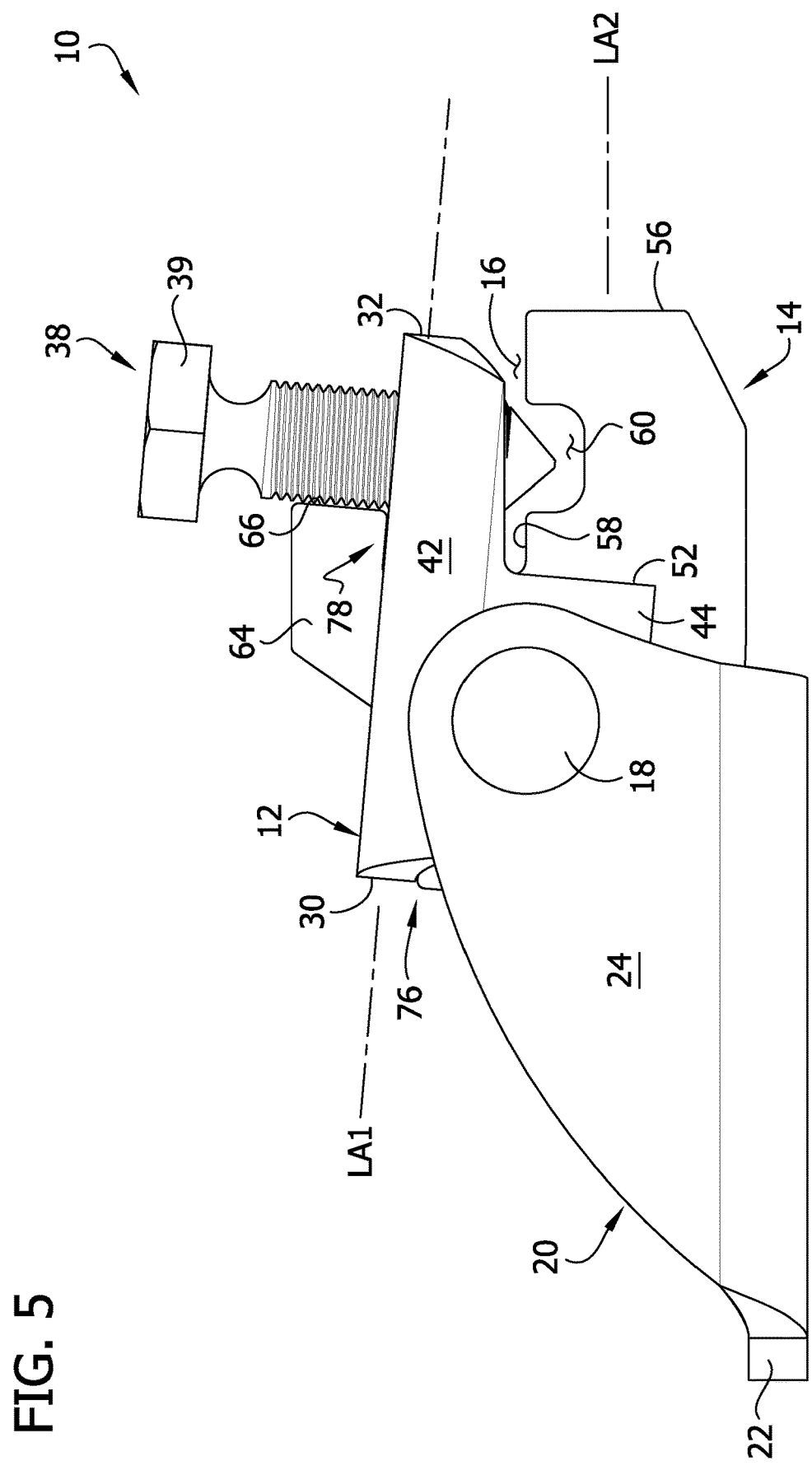
FIG. 5 is a left side view of the seismic sway brace fitting of FIG. 1, the right side view being a mirror image thereof.
Figure 6:
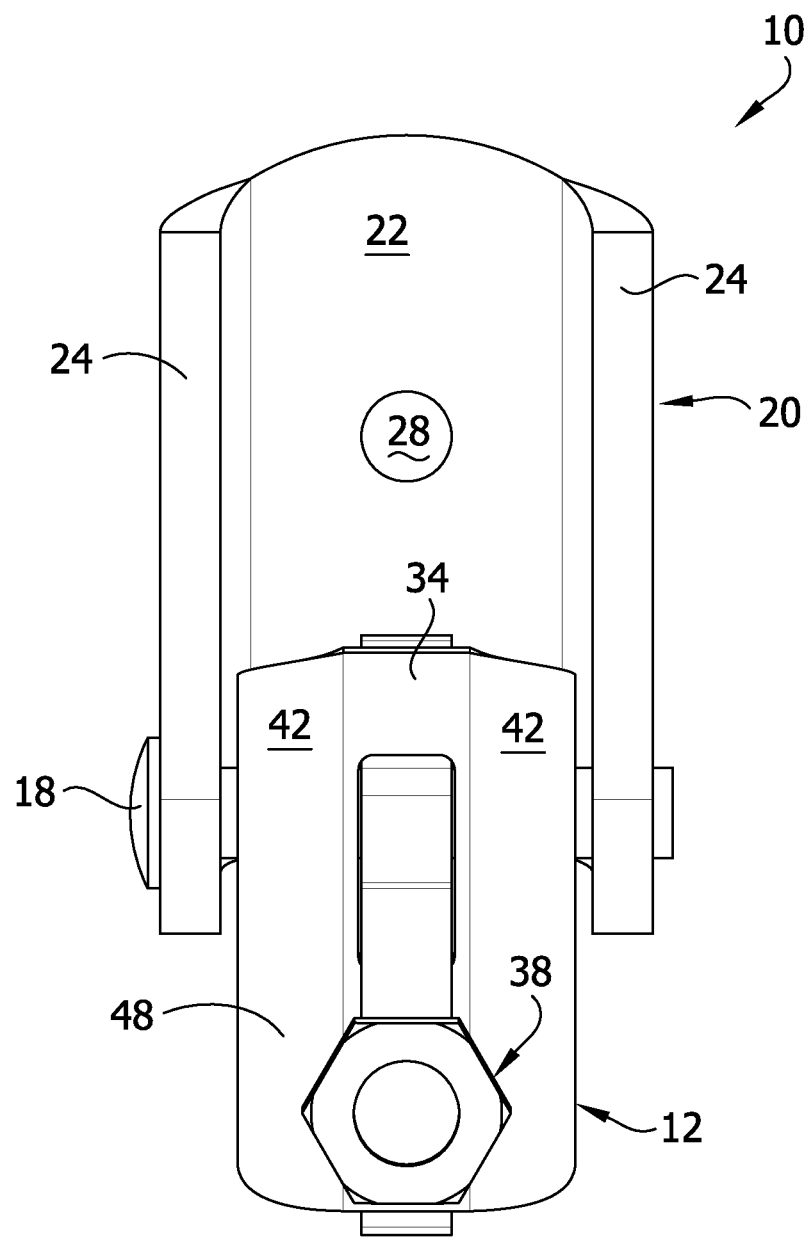
FIG. 6 is a top view of the seismic sway brace fitting of FIG. 1.
Figure 7:
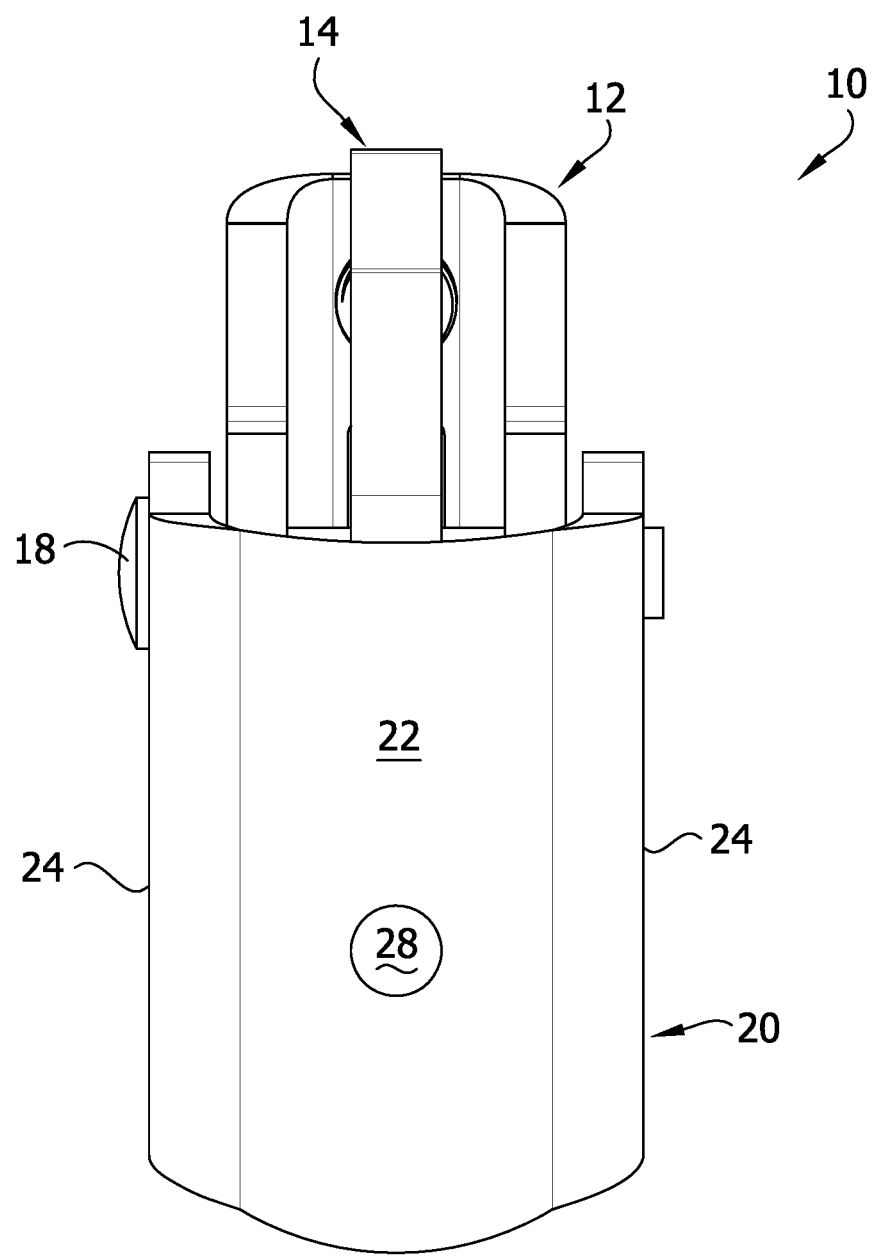
FIG. 7 is a bottom view of the seismic sway brace fitting of FIG. 1.

The second jaw 14 includes a tab 64 (broadly, a portion of the second jaw). The tab 64 is disposed at (e.g., defines) a proximal end of the upper surface 58 and extends upward from the upper surface. The tab 64 is proximal to the upper surface 58. The tab 64 is configured (e.g., sized and shaped) to extend through the second jaw opening 40 of the first jaw, as explained in more detail below. As shown in FIG. 5, the tab 64 defines (e.g., has) a fastener bearing surface 66 configured to engage the fastener 38 to inhibit the fastener from rotating relative to the first jaw 12 when the fastener secures the seismic brace P to the fitting 10. As shown in FIGS. 5 and 8, the fastener bearing surface 66 abuts or engages the fastener 38 to inhibit rotation of the fastener when the fastener is threaded into the threaded opening 36. The tab 64 also defines (e.g., has) a bearing surface 68 (FIG. 13) configured to engage a portion of the first jaw 12 to inhibit the first jaw from rotating relative to the second jaw 14, as described in more detail below. The bearing surface 68 generally opposes at least a portion (e.g., proximal portion) of the upper surface 58. The bearing surface 68 (e.g., distal bearing surface) is disposed distally of the pin location. The tab 64 also defines (e.g., has) a distal surface 70 extending between the upper surface 58 and the bearing surface 68 (specifically, the proximal ends thereof). Together, the bearing surface 68, a portion of the upper surface 58 and the distal surface 70 define a recess 72 configured to receive a portion of the first jaw 12. The recess 72 is oversized relative to the first jaw 12 and permits the first jaw to restrictively move (e.g., rotate) within the recess (e.g., permits the first and second jaws to open to an extent and to close).

Figure 12:
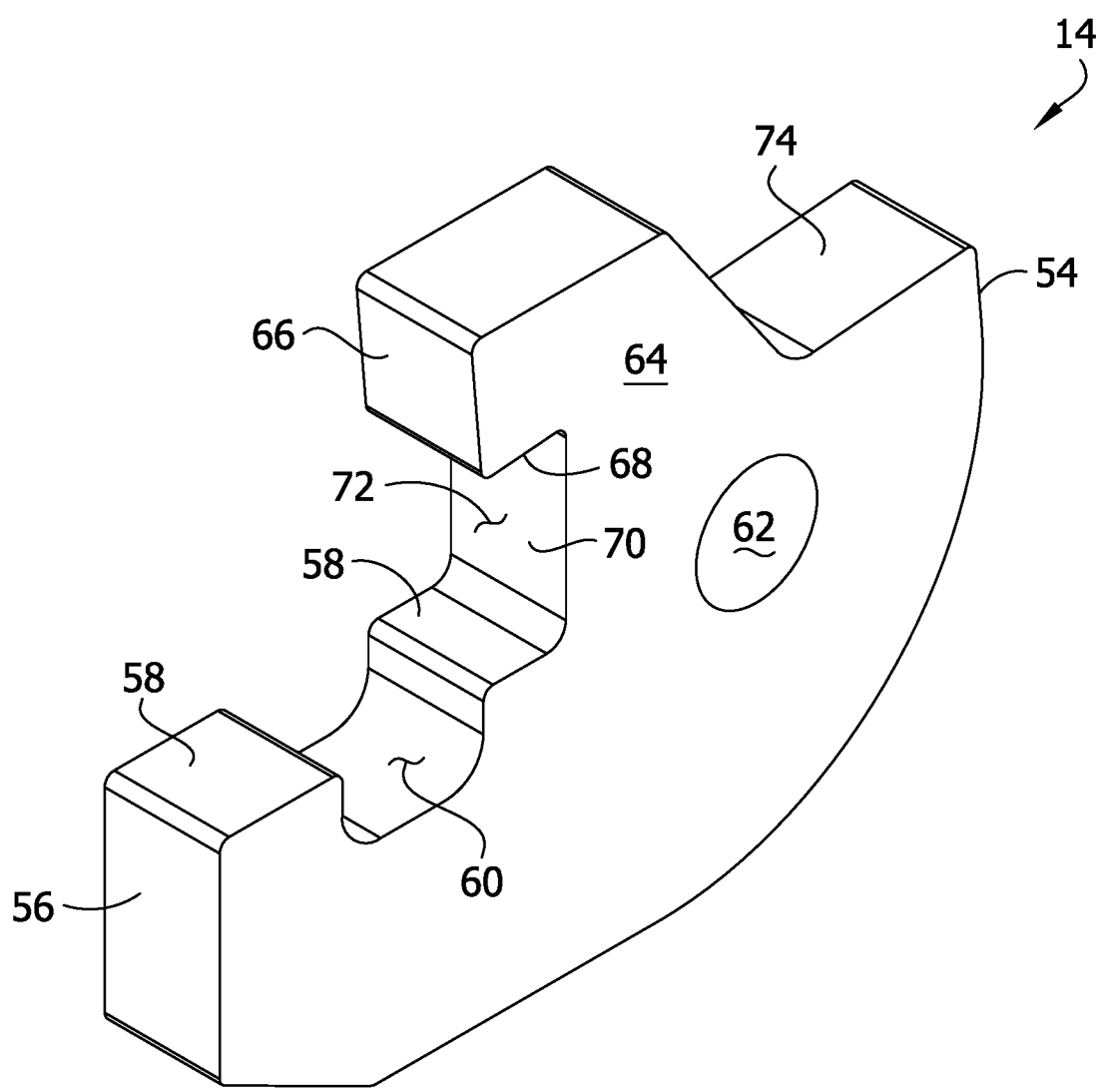
FIG. 12 is a perspective of a second jaw of the seismic sway brace fitting of FIG. 1.
Figure 13:
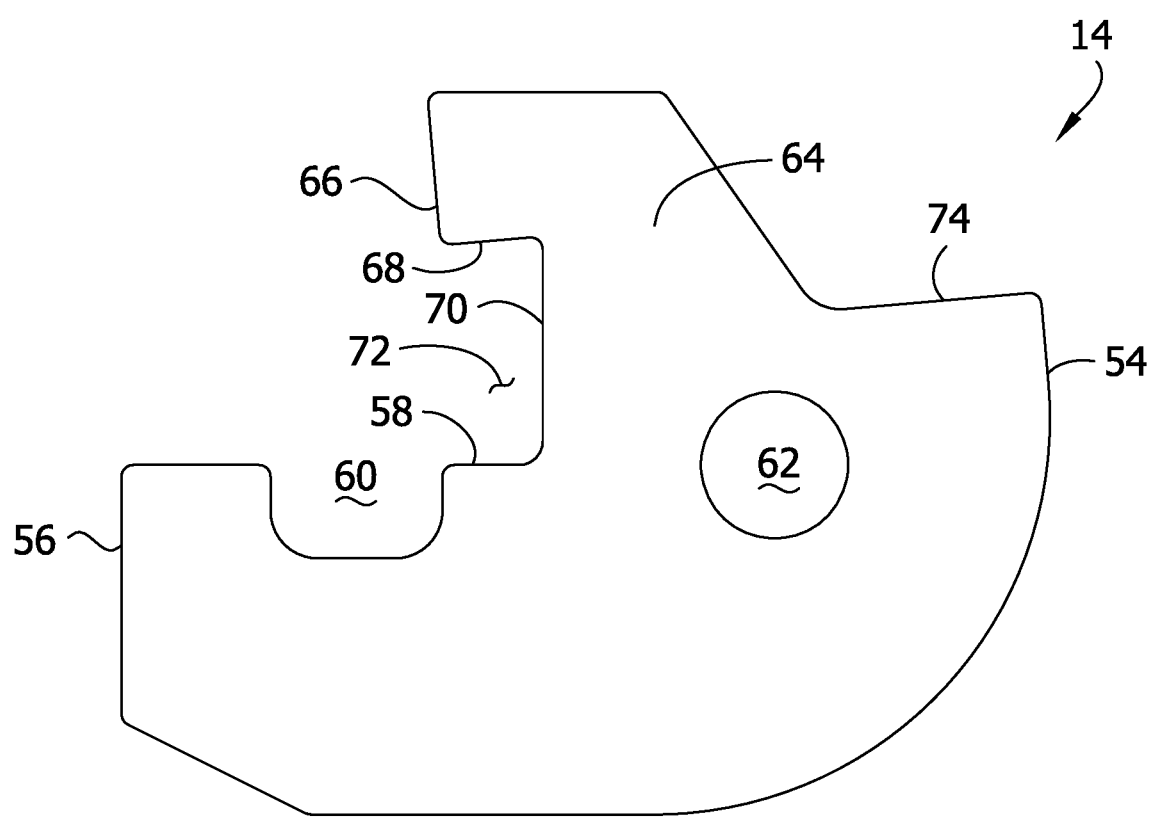
FIG. 13 is a front view of the second jaw.
Figure 14:
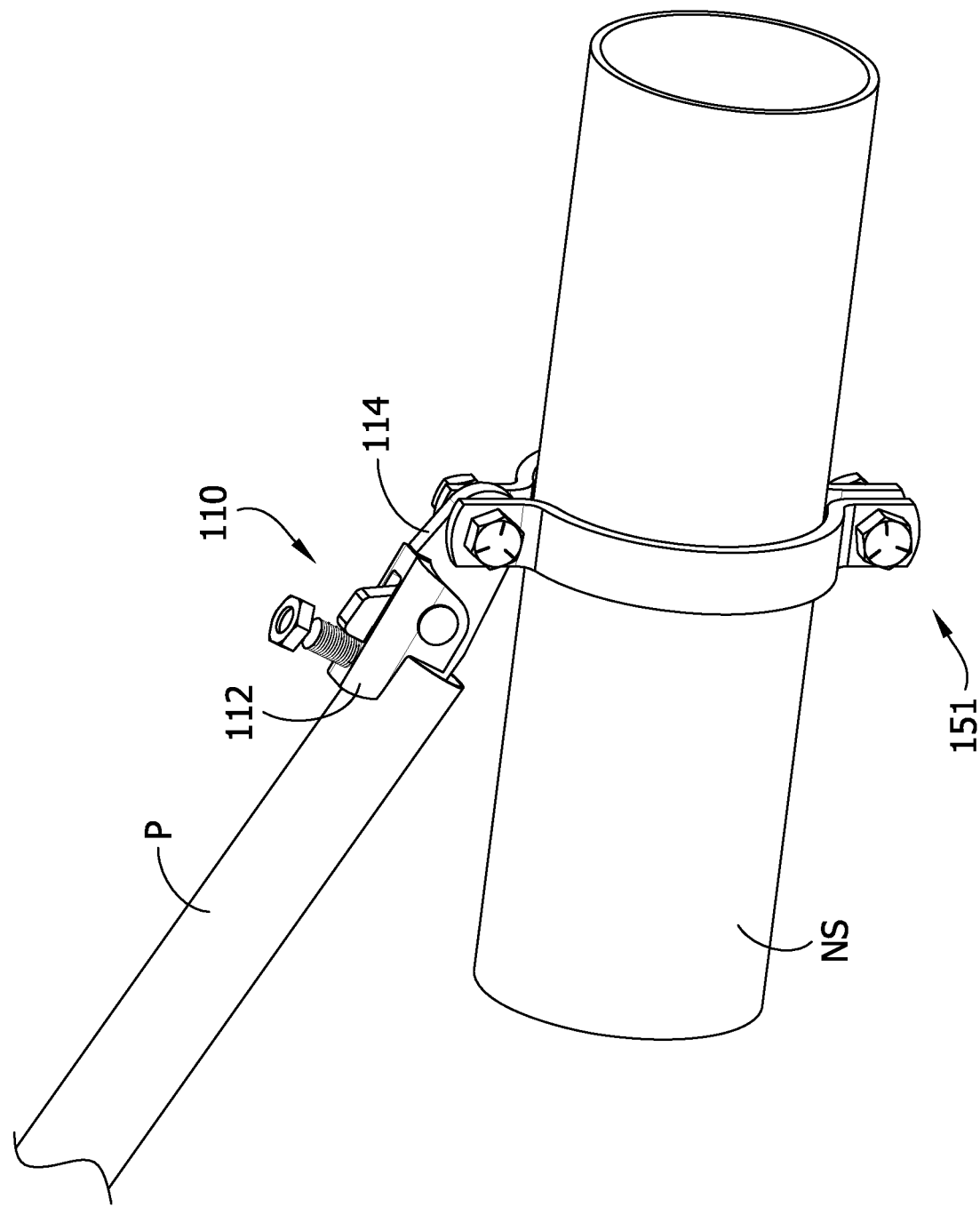
FIG. 14 is a front perspective of another embodiment of a seismic sway brace fitting attached to a seismic sway brace and a non-structural component by an attachment device according to the teachings of the present disclosure.
Figure 15:
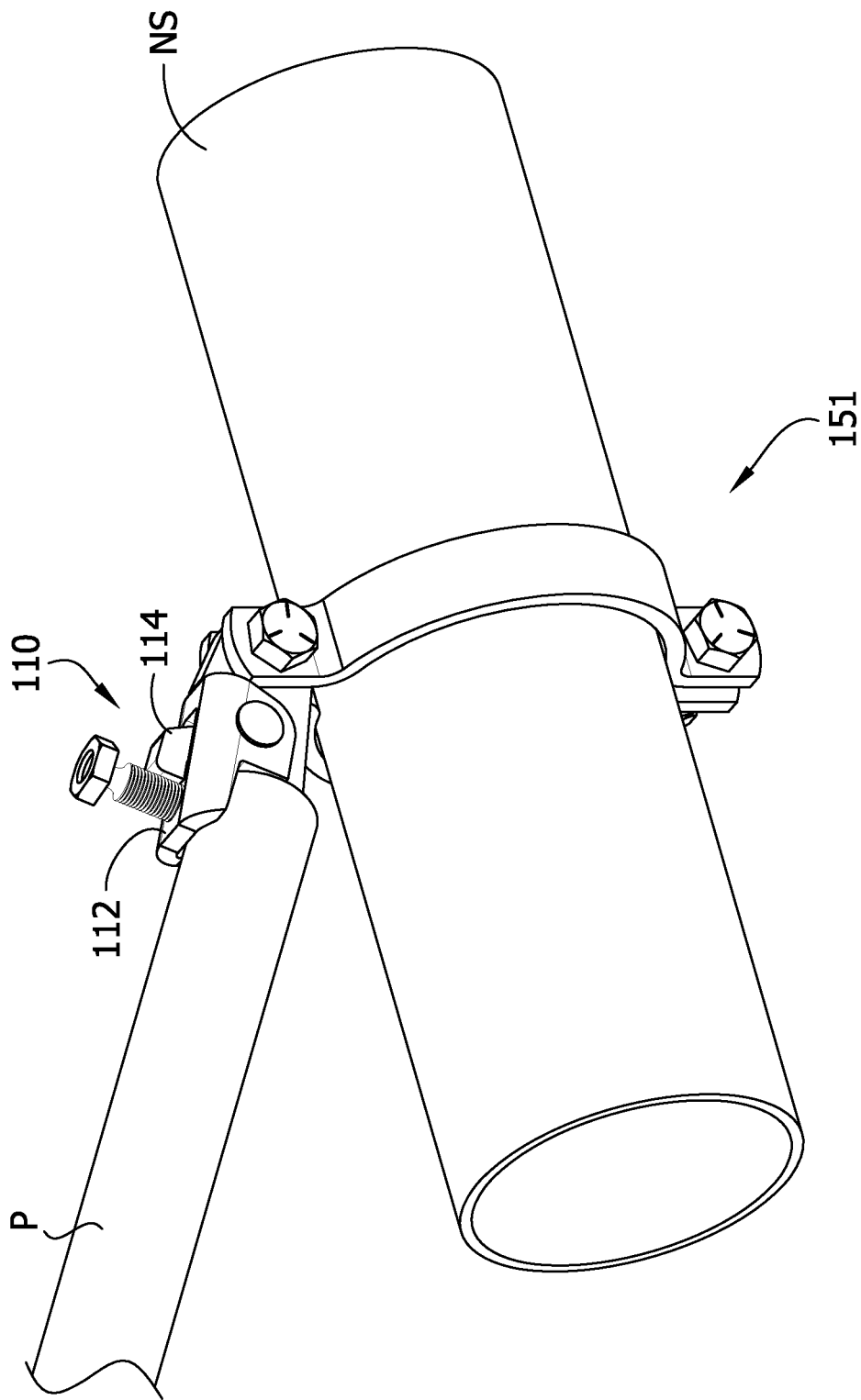
FIG. 15 is a rear perspective of the seismic sway brace fitting, seismic sway brace, non-structural component, and attachment device of FIG. 14.

Referring to FIGS. 12 and 13, the second jaw 14 includes another bearing surface 74 (e.g., proximal bearing surface) configured to engage a portion of the first jaw 12 to restrict rotation of the first jaw relative to the second jaw 14, as described in more detail below. Broadly, the distal bearing surface 68 and proximal bearing surface 74 are first and second (or vice versa) bearing surfaces of the second jaw 14. Even broader, the second jaw 14 includes at least one bearing surface, such as distal bearing surface 68 and/or proximal bearing surface 74. The proximal bearing surface 74 is disposed proximally of the pin location. In other words, the proximal bearing surface 74 is disposed between the pin location and proximal end 54 of the second jaw 14. Specifically, the proximal bearing surface 74 extends distally from the proximal end 54 of the second jaw 14. The distal and proximal bearing surfaces 68, 74 are generally parallel to one another.

In one embodiment, each of the first and second jaws 12, 14 are formed from a metal plate (e.g., each of the first and second jaws are formed from a single piece of material). For example, each of the first and second jaws 12, 14 may be punched from a metal plate and/or bent into shape. In one embodiment, the first jaw 12 is formed from a metal plate having a thickness of approximately 0.25 inches (6.4 mm) and the second jaw 12 is formed from a metal plate having a thickness of approximately 0.375 inches (9.5 mm). The use of other materials is within the scope of the present disclosure.

For reasons explained below, in the illustrated embodiment, the fastener 38 comprises a torque-limiting bolt, whereby once a desired torque on the bolt head 39 is reached the bolt head shears off the remainder of the bolt to inhibit additional tightening of the bolt.

Referring back to FIGS. 2-8, the pin 18 connects the first and second jaws 12, 14 together. When the first and second jaws 12, 14 are connected together, the tab 64 of the second jaw extends up through the second jaw opening 40 of the first jaw. Accordingly, the second jaw 14 includes portions disposed above and below the first jaw 12. A portion of the first jaw 12 (specifically, the portion of the center portion 34 between the threaded opening 36 and second jaw opening 40) is disposed in the recess 72 of the second jaw 14. The proximal and distal ends 30, 32, 54, 56 of the first and second jaws 12, 14 are generally aligned with one another. The longitudinal axes LA1, LA2 of the first and second jaws 12, 14 are generally coplanar. When connected together, the second jaw 14 is disposed between the flange portions 44 of the first jaw. Thus, the two brace bearing surfaces 52 of the first jaw 12 are disposed on opposite sides of the second jaw 14. In addition, the recess 60 of the second jaw 14 is generally aligned with the threaded opening 36 when first and second jaws are connected together, for reasons that will become apparent.

Referring to FIG. 8, to connect the fitting 10 to the end of the seismic brace P, the fitting is inserted into the open end of the seismic brace such that the circumferential wall of the seismic brace is disposed in the space 16 between the first and second jaws 12, 14. Specifically, the distal end 56 of the second jaw 14 is inserted into the hollow interior of the seismic brace P and the distal end of the first jaw 12 is positioned over the exterior surface of the seismic brace P. The first and second jaws 12, 14 can be rotated with respect to one another to slightly enlarge the space 16 to position the circumferential wall of the seismic brace in the space. The seismic brace P is inserted into the space 16 until the end of the seismic brace engages the brace bearing surfaces 52 of the first jaw 12. Once positioned, the fastener 38 is rotated by the user and tightened against the seismic brace P. The engagement between the fastener 38 and the seismic brace P causes a portion (e.g., deformed portion) of the seismic brace to deform and extend into the recess 60 (FIG. 8). This deformed portion of the seismic brace P prevents the seismic brace from longitudinally withdrawing from the fitting 10. As the fastener 38 is tightened, the upper surface 58 of the second jaw 14 engages the interior surface of the seismic brace P and the fastener engages the exterior surface of the seismic brace. Depending on the amount of deformation experienced by the seismic brace P due to the fastener 38, at least a portion of the interior surface 50 of the first jaw 12, such as a portion of the center portion 34, may also engage the seismic brace. In addition, the side portions 42 (specifically, the portion of the interior surface 50 defined thereby) may either continuously or intermittently engage the seismic brace P to inhibit the seismic brace from moving laterally (e.g., in a direction generally perpendicular to the longitudinal axes LA1, LA2). For example, tightening the fastener 38 may bring the side portion 42 into engagement with the seismic brace P (e.g., continuous engagement) or the side portions may only engage the seismic brace when the seismic brace moves laterally (e.g., intermittent engagement).

In the illustrated embodiment, the bolt head 39 of each fastener 38 shears off during fastening after a predetermined torque on the bolt head has been reached. For example, when the end of the fastener 38 engages and deforms the seismic brace P after a certain amount of tightening, additional torque applied to the bolt head 39 will shear the bolt head off the bolt thereby inhibiting additional tightening of the fastener against the seismic brace. In this way, the fitting 10 is secured to the seismic brace P and the fastener does not over deform or puncture the seismic brace, thereby weakening the connection between the fitting and seismic brace. In addition, by shearing the bolt head 39 off at a predetermined torque, a visual indication is provided to the user when an appropriate and sufficient amount of force has been applied by the fastener 38 to the seismic brace P to securely connect the fitting 10 to the seismic brace.

The fitting 10 includes multiple elements to prevent the first and second jaws 12, 14 from opening and disconnecting from the seismic brace P during a seismic event and/or tightening of the fastener 38. Specifically, the there are multiple ways the first and second jaws 12, 14 are inhibited from rotating (e.g., opening) relative to one another. First, the engagement between the at least one bearing surface 52 and the end of the seismic brace P inhibits the rotation of the first jaw 12 relative to the second jaw 14. The seismic brace P is secured to the fitting 10 and, thus, is generally inhibited from moving. Accordingly, because the seismic brace P is inhibited from moving, the engagement between the at least one bearing surface 52 and the end of the seismic brace P prevents the first jaw 12 from rotating (e.g., opening) relative to the second jaw 24.

In addition, to further prevent the first and second jaws 12, 14 from rotating relative to one another, the second jaw includes at least one bearing surface. In the illustrated embodiment, the second jaw 14 includes the proximal and distal bearing surfaces 74, 68. Each bearing surface 74, 68 of the second jaw 14 engages a portion of the of the first jaw 12 to form a contact point between the first and second jaws to inhibit the first jaw from rotating relative to the second jaw. In the illustrated embodiment, as shown in FIGS. 5 and 8, the proximal bearing surface 74 engages a portion of the first jaw 12 to form a contact point 76 (e.g., proximal contact point) that is disposed proximally of the pin location. In other words, the contact point 76 is formed by the engagement of proximal bearing surface 74 and the first jaw 12 is proximal of the pin 18 (e.g., disposed between the proximal ends 30, 54 of the first and second jaws and the pin). In the illustrated embodiment, the proximal contact point 76 is adjacent to the proximal ends 30, 54 of the first and second jaws 12, 14 (e.g., the contact point 76 extends distally from the proximal ends of the first and second jaws). It is understood that the proximal contact point 76 may extend over the entire area of the proximal bearing surface 74 or a portion of the area. The proximal bearing surface 74 engages a portion of the interior surface 50 of the first jaw 12 (specifically, a portion of the center portion 34) to define the proximal contact point 76. The engagement between the proximal bearing surface 74 and the first jaw 12 inhibits the first jaw from rotating (in the counter-clockwise direction as shown in FIG. 8) relative to the second jaw 14, thereby preventing the first and second jaws from opening and loosening and/or losing the fitting's 10 grip on the seismic brace P.

Similarly, as shown in FIGS. 2, 5 and 8, the distal bearing surface 68 engages a portion of the first jaw 12 to form a contact point 78 (e.g., distal contact point) that is disposed distally of the pin location. In other words, the contact point 78 is formed by the engagement of distal bearing surface 68 and the first jaw 12 is distal of the pin 18 (e.g., disposed between the distal ends 32, 56 of the first and second jaws and the pin). In the illustrated embodiment, the distal contact point 78 is aligned with (e.g., overlies) the space 16 and extends generally between the second jaw opening 40 and the threaded opening 36. It is understood that the distal contact point 78 may extend over the entire area of the distal bearing surface 68 or a portion of the area. The distal bearing surface 68 engages a portion of the exterior surface 48 of the first jaw 12 (specifically, a portion of the center portion 34) to define the distal contact point 78. The engagement between the distal bearing surface 68 and the first jaw 12 inhibits the first jaw from rotating (in the counter-clockwise direction as shown in FIG. 8) relative to the second jaw 14, thereby preventing the first and second jaws from opening and loosening and/or losing the fitting's 10 grip on the seismic brace P. Broadly, the proximal and distal contact points 76, 78 are first and second (or vice versa) contact points. The bearing surfaces 68, 74 are described herein with reference to the second jaw 14, however, it is understood that the one or more bearing surfaces described herein may be on and described with reference to the first jaw 12 (e.g., the first jaw includes one or more bearing surfaces that engage one or more portions of the second jaw to form one or more contact points to inhibit rotation).

Generally, the proximal and distal contact points 76, 78 are formed at the same time (e.g., the proximal and distal bearing surfaces 74, 68 contact the first jaw 12 as the same time). Thus, the proximal and distal bearing surfaces 74, 68 generally lie in separate, spaced apart parallel planes, the planes being spaced apart by the thickness or height of the first jaw 12 (specifically, the center portion 34). Moreover, the bearing surfaces 74, 68 are disposed above and below the first jaw 12 to inhibit rotation. In particular, the bearing surfaces 74, 68 restrict (e.g., inhibit, prevent, limit) the opening of the first and second jaws 12, 14 (e.g., limit the amount the first and second jaws can open). In addition, the longitudinal axis LA1 of the first jaw 12 is at an angle to the longitudinal axis LA2 of the second jaw 14 when the first jaw engages the second jaw to form the proximal and distal contact points 76, 78 (e.g., when the proximal and distal bearing surfaces 74, 68 engage the first jaw). For example, the angle of the longitudinal axis LA1 of the first jaw 12 relative to the longitudinal axis LA2 of the second jaw 14 may be between about 0 to 10 degrees. In one embodiment, the angle of the longitudinal axis LA1 of the first jaw 12 relative to the longitudinal axis LA2 of the second jaw 14 is about 5 degrees. The proximal and distal bearing surfaces 74, 68 establish the angle of the longitudinal axis LA1 of the first jaw 12 relative to the longitudinal axis LA2 of the second jaw 14. Accordingly, the angle of the proximal and distal bearing surfaces 74, 68 relative to the longitudinal axis LA2 of the second jaw 14 may be between about 0 to 10 degrees, such as about 5 degrees. Other configurations are within the scope of the present disclosure. By angling the first jaw 12 relative to the second jaw 14, a pre-loading (e.g., pre-stress) effect is obtained to counteract any load applied from the fastener 38. Specifically, any deformation, deflection and/or twisting in the first jaw 12 caused by the load from the fastener 38 and/or seismic event results in the fastener 38 moving further into the seismic brace P (e.g., the fastener rotates generally in a counter-clockwise direction as shown in FIG. 8), further strengthening the connection between the fitting 10 and seismic brace.

Moreover, the pin 18 is configured to inhibit the first jaw 12 from rotating relative to the second jaw 14 when the proximal bearing surface 74 engages the interior surface 50 of the first jaw. The formation of the proximal contact point 76 by the engagement of the proximal bearing surface 74 and the first jaw 12 during loading and/or a seismic event creates a pivot point at the proximal contact point about which the first and second jaws tend to rotate about relative to one another. Accordingly, because the creation of the proximal contact point 76 (and the distal contact point 78 to a certain extent) changes the location about which the first and second jaws 12, 14 tend to rotate with respect to one another from the pin location (e.g., the first and second jaws no longer pivot about the pin 18 but about a point spaced part from the pin), the pin further inhibits the first jaw from rotating relative to the second jaw.

Therefore, the fitting 10 described herein includes four different features to inhibit the first jaw 12 from rotating relative to the second jaw 14 (e.g., preventing the first and second jaws from opening and releasing the seismic brace P): the at least one brace bearing surface 52, the proximal bearing surface 74, the distal bearing surface 68 and the pin 18. It is understood that a fitting constructed according to the teachings herein can have one, multiple (including any combination) or all of the elements described herein that inhibit the first and second jaws 12, 14 from rotating relative to one another. The additional elements inhibiting rotation of the first and second jaws 12, 14 increases the strength of the connection between the fitting 10 and the seismic brace P over conventional fittings, such as the fitting described in U.S. Pat. No. 6,273,372. By using multiple (e.g., four) elements to withstand the load from tightening the fastener 38 and the seismic event, thereby inhibiting the rotation of the first and second jaws 12, 14, a stronger connection between the fitting 10 and seismic brace is obtained.

Referring to FIGS. 14-19, another embodiment of a seismic sway brace fitting (e.g., sway brace fitting or fitting) is generally indicated at reference numeral 110. The fitting 110 is substantially similar to the fitting 10 of the previous embodiment. However, the fitting 110 secures a seismic brace, such as a pipe P (FIGS. 14 and 15), to a non-structural component NS (e.g., pipes, cable trays, HVAC components, conduits, etc.) thereby coupling the non-structural component to the structural component of the building via the sway brace. Thus, the fitting 110 is attached to an opposite end of the sway brace P as the fitting 10. Broadly, the fitting 110 is configured for use with a seismic brace P having a cylindrical cross-sectional shape, although in other embodiments the fitting may be configured to attach to seismic braces having other shapes.

Figure 16:
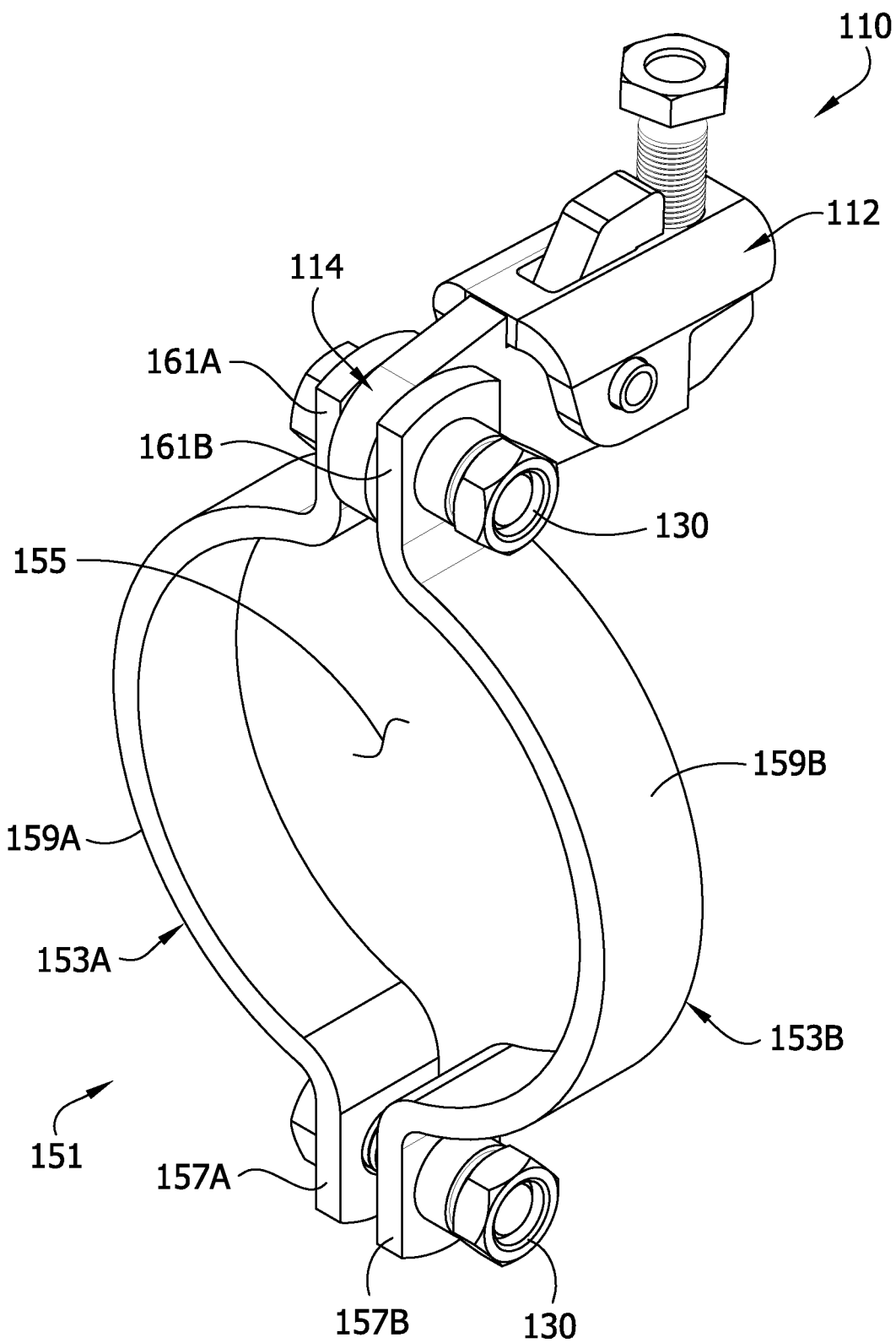
FIG. 16 is a perspective of the seismic sway brace fitting and attachment device of FIG. 14.
Figure 17:
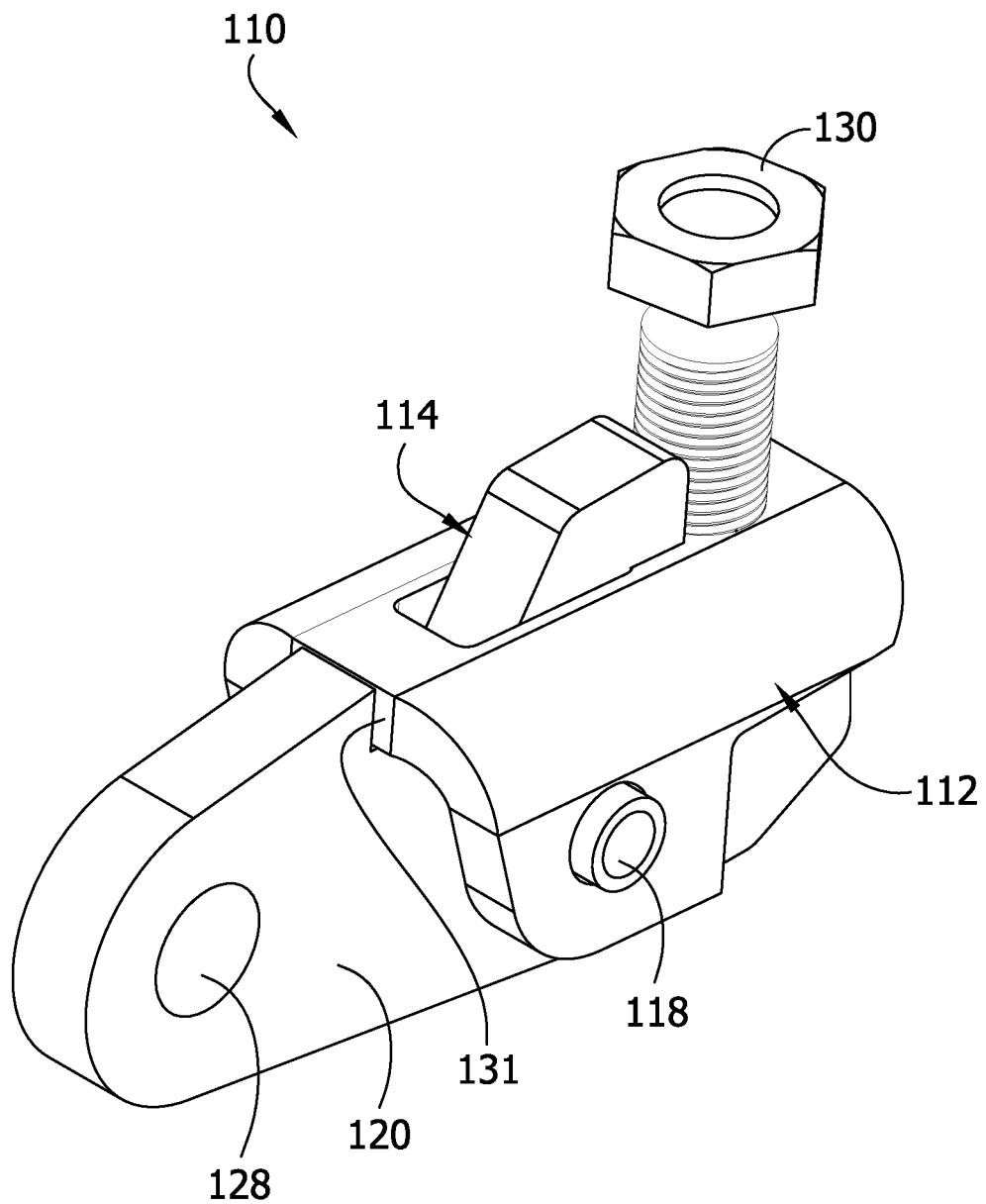
FIG. 17 is a rear perspective of the seismic sway brace fitting of FIG. 14.
Figure 18:
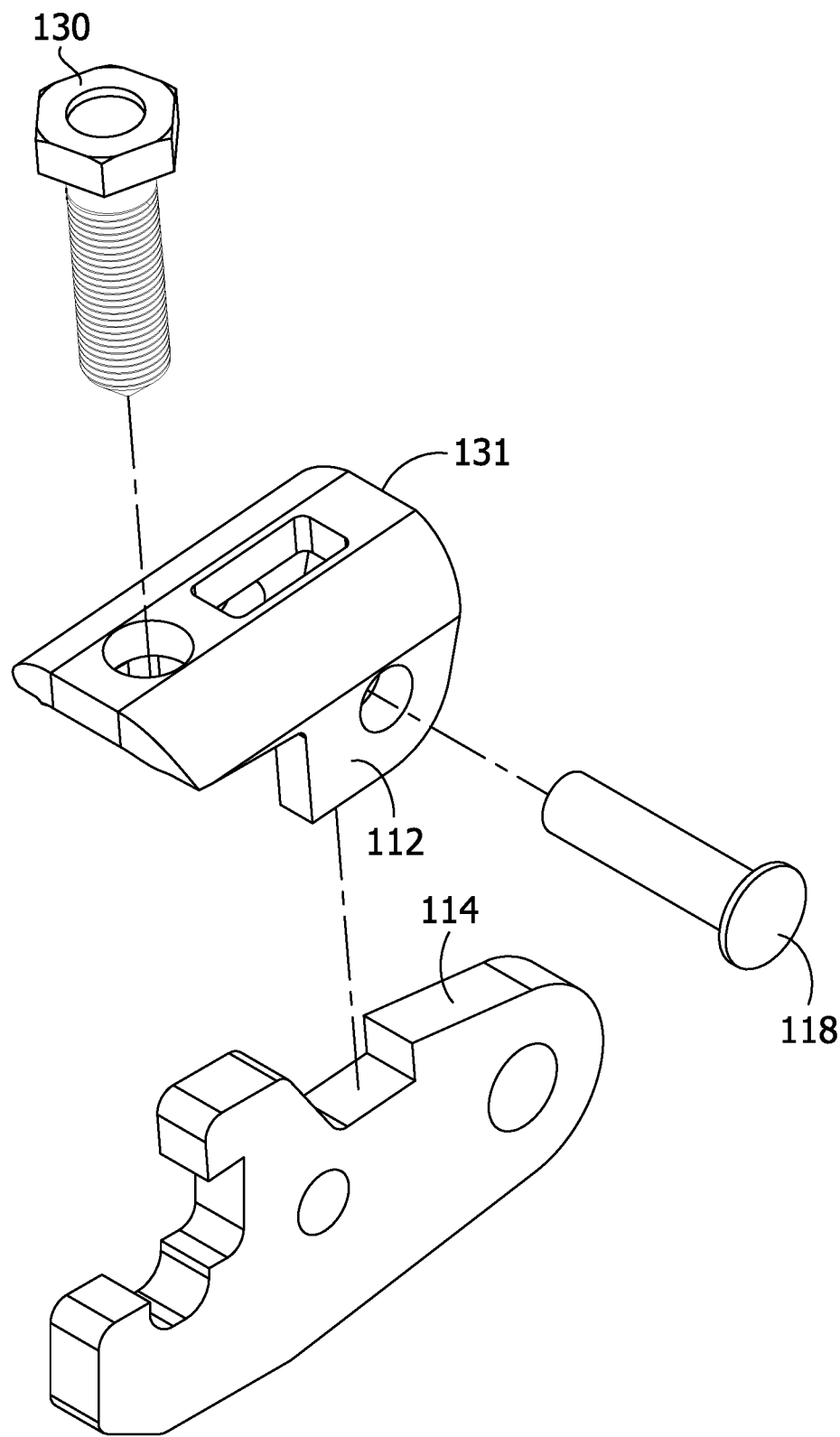
FIG. 18 is an exploded view of the seismic sway brace fitting of FIG. 14.
Figure 19:
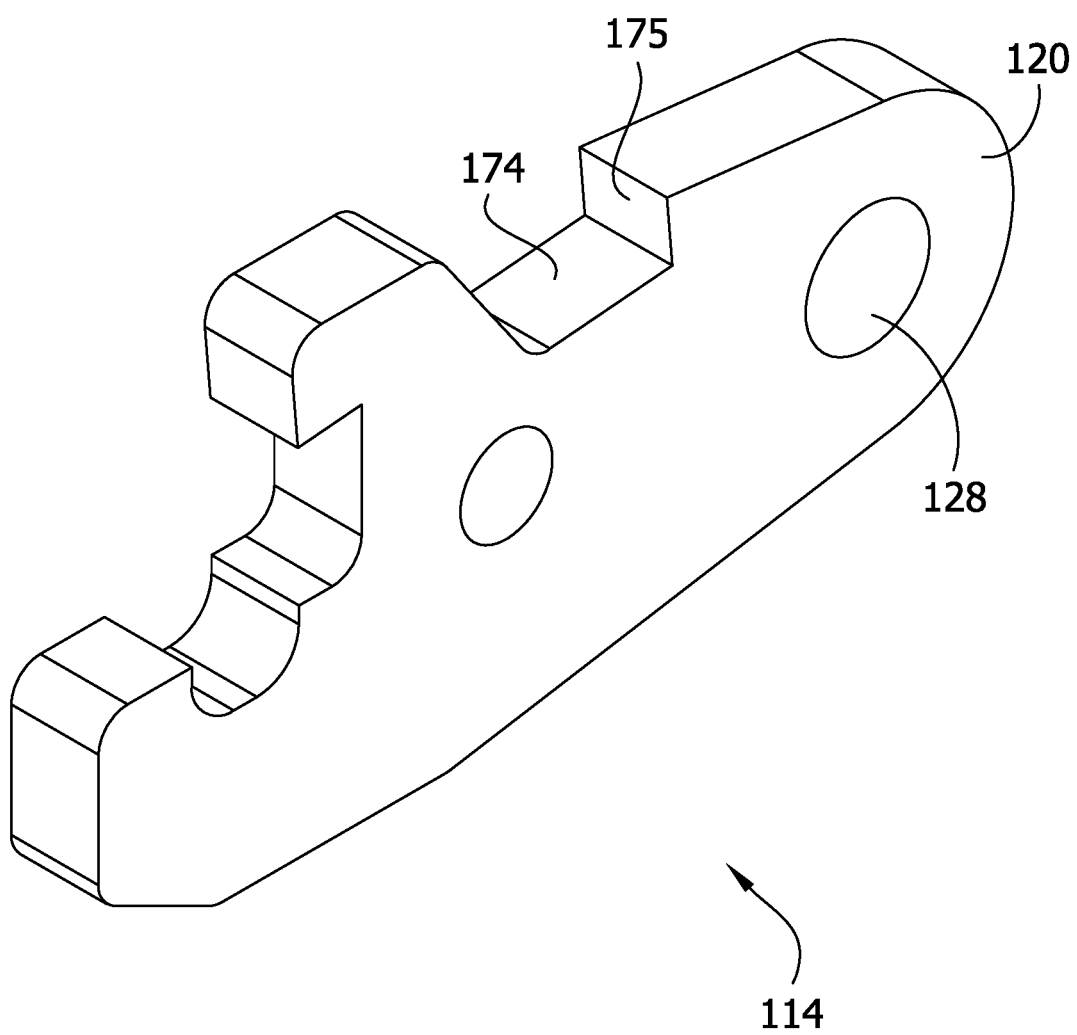
FIG. 19 is a perspective of a second jaw of the seismic sway brace fitting of FIG. 14.

Referring to FIGS. 17-19, the fitting 110 includes a first jaw or collar 112 and a second jaw or center plate 114 connected to the first jaw. The first and second jaws 112, 114 define a space configured to receive an end portion of the seismic brace P (e.g., an open end of a pipe). The first and second jaws 112, 114 are configured to be positioned on opposite sides of a circumferential wall of the pipe P to grip the wall therebetween and secure the pipe P (e.g., seismic brace) to the fitting 110. The fitting 110 includes a pin 118 connecting the first and second jaws to one another. The pin 118 pivotably connects the first and second jaws 112, 114. The second jaw 114 defines an opening 128 configured to receive a fastener 130 (FIG. 16) to attach the second jaw, and therefore the fitting 110, to an attachment device 151 for coupling the fitting to a non-structural component NS of a building. Thus, the fitting 110 omits the yoke 20 of the fitting 10 of the previous embodiment and extends a back portion 120 of the second jaw 114 away from the first jaw 112 to provide a surface for opening 128. The extension of the back portion 120 of the second jaw 114 defines a stop surface 175 (FIG. 19) extending transversely from bearing surface 174. In the illustrated embodiment, the stop surface 175 extends upward from the bearing surface 174. The stop surface 175 opposes a proximal end 131 of the first jaw 112 to restrict (e.g., inhibit, prevent, limit) the opening of the first and second jaws 112, 114 (e.g., limit the amount the first and second jaws can open). The fitting 110 is otherwise constructed substantially identically to fitting 10.

Referring to FIG. 16, the attachment device 151 comprises first and second attachment device members 153A and 153B, respectively. The first and second attachment device members 153A, 153B are configured to be connected together such that they circumferentially extend around the non-structural component NS. When the first and second attachment device members 153A, 153B are connected together, they define a receiving space 155 sized and shaped to receive the non-structural component NS.

Each of the first and second attachment device members 153A, 153B includes a first planar portion 157A, 157B extending generally vertically from a free end of the planar portion, an arcuate portion 159A, 159B extending from the first planar portion, and a second planar portion 161A, 161B extending generally vertically upward from the arcuate portion. In the illustrated embodiment, each of the first and second planar portions 157A, 157B, 161A, 161B define a fastener opening that receives a fastener 130 (e.g., fastener assembly—bolt, nut, washers) to connect the first and second attachment device members 153A, 153B together. When connected together, the fastener openings in the second planar portions 161A, 161B are aligned with the opening 128 in the second jaw 114 such that a fastener 130 can be inserted there-through. Thus, the second planar portions 161A, 161B define the portions of the attachment device 151 that connect to the fitting 110. It is understood that other ways of attaching the first and second attachment device members 153A, 153B to one another, and to the fitting 110, are within the scope of the present disclosure.

Modifications and variations of the disclosed embodiments are possible without departing from the scope of the invention defined in the appended claims.

When introducing elements of the present invention or the embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A seismic sway brace fitting for a seismic brace, the seismic sway brace fitting comprising:
  a first jaw defining a threaded opening configured to receive a fastener to secure the seismic sway brace fitting to the seismic brace, the first jaw comprising a center portion and at least one flange portion extending from a side of the center portion;
  a second jaw; and
  a pin connecting the first and second jaws to one another;
  wherein the first and second jaws define a space configured to receive an end portion of the seismic brace, the threaded opening aligned with the space such that the fastener extends into the space to engage the end portion of the seismic brace when the fastener is received in the threaded opening to secure the seismic brace to the sway brace fitting, the first jaw including at least one brace bearing surface configured to engage an end of the seismic brace to inhibit the rotation of the first jaw relative to the second jaw, wherein the at least one brace bearing surface is defined by the at least one flange portion of the first jaw.

2. The seismic sway brace fitting of claim 1, wherein the at least one brace bearing surface includes first and second brace bearing surfaces.

3. The seismic sway brace fitting of claim 2, wherein the first and second brace bearing surfaces are disposed on opposite sides of the second jaw.

4. The seismic sway brace fitting of claim 1, wherein the second jaw includes a bearing surface configured to engage a portion of the first jaw to form a contact point between the first and second jaws to inhibit the first jaw from rotating relative to the second jaw.

5. The seismic sway brace fitting of claim 4, wherein the first and second jaws each have opposite proximal and distal ends, the first and second jaws being connected by the pin at a pin location disposed between the proximal and distal ends of each of the first and second jaws.

6. The seismic sway brace fitting of claim 5, wherein the bearing surface of the second jaw is disposed proximally of the pin location and the contact point is disposed proximally of the pin location.

7. The seismic sway brace fitting of claim 5, wherein the bearing surface of the second jaw is disposed distally of the pin location and the contact point is disposed distally of the pin location.

8. The seismic sway brace fitting of claim 5, wherein the bearing surface of the second jaw is a first bearing surface and the contact point is a first contact point, wherein the second jaw includes a second bearing surface configured to engage a portion of the first jaw to form a second contact point between the first and second jaws to inhibit the first jaw from rotating relative to the second jaw.

9. The seismic sway brace fitting of claim 8, wherein the first bearing surface is disposed proximally of the pin location and the first contact point is disposed proximally of the pin location.

10. The seismic sway brace fitting of claim 9, wherein the second bearing surface is disposed distally of the pin location and the second contact point is disposed distally of the pin location.

11. The seismic sway brace fitting of claim 10, wherein the first and second jaws each define a longitudinal axis extending between the proximal and distal ends of the first and second jaws, the longitudinal axes of the first and second jaws being coplanar, wherein the longitudinal axis of the first jaw is at an angle to the longitudinal axis of the second jaw when the first jaw engages the second jaw to form the first and second contact points.

12. The seismic sway brace fitting of claim 10, wherein the first bearing surface engages a lower surface of the first jaw and the second bearing surface engages an upper surface of the first jaw.

13. The seismic sway brace fitting of claim 12, wherein the pin is configured to inhibit the first jaw from rotating relative to the second jaw when the first bearing surface engages the lower surface of the first jaw.

14. The seismic sway brace fitting of claim 8, wherein the first jaw defines an opening and the second jaw includes a tab that extends through the opening, the tab defining the second bearing surface.

15. The seismic sway brace fitting of claim 14, wherein the tab further defines a fastener bearing surface configured to engage the fastener to inhibit the fastener from rotating relative to the first jaw when the fastener secures the seismic brace to the seismic sway brace fitting.

16. The seismic sway brace fitting of claim 1, wherein a portion of the first jaw that defines the space configured to receive the end portion of the seismic brace has a U-shaped cross-section.

17. The seismic sway brace fitting of claim 1, in combination with the fastener, wherein the fastener is a torque-limiting bolt.

18. A seismic sway brace fitting for a seismic brace, the seismic sway brace fitting comprising:
  a first jaw defining a threaded opening configured to receive a fastener to secure the seismic brace to the sway brace fitting, the first jaw having proximal and distal ends, the first jaw having an interior surface;
  a second jaw connected to the first jaw; and
  a pin connecting the first and second jaws, the pin disposed between the proximal and distal ends of the first jaw, wherein the first and second jaws are rotatable relative to one another about the pin;
  wherein the first and second jaws define a space adjacent to the distal end of the first jaw, the space configured to receive an end portion of the seismic brace, the threaded opening aligned with the space such that the fastener extends into the space to engage the end portion of the seismic brace when the fastener is received in the threaded opening to secure the seismic brace to the sway brace fitting, the second jaw including a bearing surface disposed proximally of the pin and configured to engage an upper portion of the interior surface of the first jaw to form a contact point between the first and second jaws to inhibit relative rotation in a counter-clockwise direction between the first and second jaws about the pin.

19. The seismic sway brace fitting of claim 18, wherein the bearing surface is a first bearing surface and the contact point is a first contact point, wherein the second jaw includes a second bearing surface distal of the pivot pin and configured to engage an exterior portion of the first jaw to form a second contact point between the first and second jaws to inhibit relative rotation in a counter-clockwise direction between the first and second jaws about the pin.

20. A seismic sway brace fitting for a seismic brace, the seismic sway brace fitting comprising:
- a first jaw defining a threaded opening configured to receive a fastener to secure the seismic brace to the sway brace fitting, the first jaw having proximal and distal ends;
- a second jaw connected to the first jaw; and
- a pin connecting the first and second jaws, the pin disposed between the proximal and distal ends of the first jaw;
- wherein the first and second jaws define a space adjacent to the distal end of the first jaw, the space configured to receive an end portion of the seismic brace, the threaded opening aligned with the space such that the fastener extends into the space to engage the end portion of the seismic brace when the fastener is received in the threaded opening to secure the seismic brace to the sway brace fitting, the second jaw including a bearing surface disposed proximally of the pin and configured to engage a portion of the first jaw to form a contact point between the first and second jaws, wherein the first and second jaws each define a longitudinal axis, wherein the longitudinal axis of the first jaw is non-parallel to the longitudinal axis of the second jaw when the first and second jaws engage one another to limit the opening of the first and second jaws.

* * * * *